US008209623B2

(12) United States Patent
Barletta et al.

(10) Patent No.: US 8,209,623 B2
(45) Date of Patent: Jun. 26, 2012

(54) VISUALIZATION AND CONTROL TECHNIQUES FOR MULTIMEDIA DIGITAL CONTENT

(75) Inventors: Antonio Barletta, Stuttgart (DE); Boris Moser, Walheim (DE); Matthias Mayer, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 271 days.

(21) Appl. No.: 10/581,460

(22) PCT Filed: Aug. 18, 2004

(86) PCT No.: PCT/EP2004/009278
§ 371 (c)(1),
(2), (4) Date: Feb. 13, 2007

(87) PCT Pub. No.: WO2005/055085
PCT Pub. Date: Jun. 16, 2005

(65) Prior Publication Data
US 2007/0168413 A1 Jul. 19, 2007

(30) Foreign Application Priority Data
Dec. 5, 2003 (EP) .................................... 03028103

(51) Int. Cl.
G06F 3/048 (2006.01)
G06F 3/033 (2006.01)
(52) U.S. Cl. .................... 715/776; 715/851; 715/863
(58) Field of Classification Search .................. 715/776, 715/777, 817, 818, 819, 820, 854, 855, 863, 715/738, 716, 719, 723, 851
See application file for complete search history.

(56) References Cited

U.S. PATENT DOCUMENTS
5,708,767 A 1/1998 Yeo et al.
5,754,728 A 5/1998 Nakajima et al.
(Continued)

FOREIGN PATENT DOCUMENTS
CA 2387404 4/2001
(Continued)

OTHER PUBLICATIONS
Yong Rui et al., "Efficient Acces to Video Content in a Unified Framework", Multimedia Computing and Systems, XP010519479, pp. 735-740, 1999.
(Continued)

Primary Examiner — Simon Ke
Assistant Examiner — Rashawn Tillery
(74) Attorney, Agent, or Firm — Oblon, Spivak, McClelland, Maier & Neustadt, L.L.P.

(57) ABSTRACT

A multimedia preview system in a client/server-based network environment for browsing content of requested multimedia data to be previewed includes a processor. The content is displayed on a client terminal for accessing a multimedia server that holds the requested multimedia data. The processor adapts a detail level of a presentation of at least one of text and an image associated with the requested multimedia data, depending on markup tags associated with the multimedia data and a frequency of commands indicating a speed at which the multimedia preview system is to browse through the at least one of the text and the image, such that the detail level of the presentation of the at least one of the text and the image is higher when the speed is lower and vice versa, and changes a layout of the at least one of the text and the image depending on the speed.

18 Claims, 21 Drawing Sheets

U.S. PATENT DOCUMENTS

| | | | |
|---|---|---|---|
| 5,761,485 | A | 6/1998 | Munyan |
| 5,847,703 | A | 12/1998 | Teicher et al. |
| 5,864,366 | A | 1/1999 | Yeo |
| 5,884,056 | A | 3/1999 | Steele |
| 5,995,095 | A | 11/1999 | Ratakonda |
| 6,178,270 | B1 | 1/2001 | Taylor et al. |
| 6,263,507 | B1 | 7/2001 | Ahmad et al. |
| 6,278,446 | B1 | 8/2001 | Liou et al. |
| 6,492,998 | B1 | 12/2002 | Kim et al. |
| 6,493,734 | B1 | 12/2002 | Sachs et al. |
| 6,535,639 | B1 | 3/2003 | Uchihachi et al. |
| 6,549,643 | B1 | 4/2003 | Toklu et al. |
| 6,690,387 | B2 * | 2/2004 | Zimmerman et al. ........ 345/684 |
| 6,847,388 | B2 * | 1/2005 | Anderson .................... 715/854 |
| 7,152,210 | B1 * | 12/2006 | Van Den Hoven et al. ... 715/723 |
| 7,698,652 | B2 * | 4/2010 | Sagar ........................... 715/787 |
| 2001/0003813 | A1 | 6/2001 | Sugano et al. |
| 2002/0018074 | A1 | 2/2002 | Buil et al. |
| 2002/0051010 | A1 | 5/2002 | Jun et al. |
| 2002/0051077 | A1 | 5/2002 | Liou et al. |
| 2002/0054074 | A1 | 5/2002 | Sugano et al. |
| 2002/0054083 | A1 | 5/2002 | Boreczky et al. |
| 2002/0070958 | A1 | 6/2002 | Yeo et al. |
| 2002/0083473 | A1 | 6/2002 | Agnihotri et al. |
| 2002/0093591 | A1 | 7/2002 | Gong et al. |
| 2002/0126143 | A1 | 9/2002 | Bae et al. |
| 2002/0186235 | A1 | 12/2002 | Dimitrova et al. |
| 2003/0007555 | A1 | 1/2003 | Divakaran et al. |
| 2003/0050927 | A1 * | 3/2003 | Hussam ........................... 707/5 |
| 2003/0061612 | A1 | 3/2003 | Lee et al. |
| 2003/0210226 | A1 * | 11/2003 | Ho et al. ....................... 345/156 |
| 2004/0021676 | A1 * | 2/2004 | Chen et al. .................... 345/684 |

FOREIGN PATENT DOCUMENTS

| | | |
|---|---|---|
| CN | 1382288 | 11/2002 |
| DE | 10049165 | 4/2002 |
| DE | 10124523 | 11/2002 |
| EP | 0 676 878 | 10/1995 |
| EP | 0938054 | 8/1999 |
| EP | 1043664 | 10/2000 |
| EP | 1 113 371 | 7/2001 |
| EP | 1182584 | 2/2002 |
| EP | 1 205 898 | 5/2002 |
| EP | 1222634 | 7/2002 |
| EP | 1271359 | 1/2003 |
| EP | 1282049 | 2/2003 |
| GB | 2 322 225 | 8/1998 |
| JP | 2001157165 | 6/2001 |
| JP | 2001265812 | 9/2001 |
| JP | 2002281438 | 9/2002 |
| JP | 2002290954 | 10/2002 |
| JP | 2003050804 | 2/2003 |
| KR | 20010050596 | 6/2001 |
| WO | WO 00/39707 | 7/2000 |
| WO | WO0127876 | 4/2001 |
| WO | WO 03047876 | 6/2003 |

OTHER PUBLICATIONS

C. Snoek et al.; "Multimodal Video Indexing: A Review of the State-of-the-art". Intelligent Sensory Information Systems. University of Amsterdam, The Netherlands. 38 pages.

John Boreczky et al.; "An Interactive Comic Book Presentation for Exploring Video." FX Palo Alto Laboratory, Inc. 8 pages.

S. Pfeiffer et al.; "Abstracting Digital Movies Automatically." Universität Mannheim Praktische Informatik IV L 15, 16 D-68131 Mannheim. 16 Pages.

Shingo Uchihashi et al.; "Video *Manga*: Generating Semantically Meaningful Video Summaries". FX Palo Alto Laboratory. pp. 383-392.

Isee Video Leafing. Movie 1:30 sec frames/ 5 sec subframes. 87 pages.

Isee-Leafing a Video. System Design. 42 pages.

A. Barletta; "Leafing Through the Multimedia Content". 7 pages.

Synaptics Introducing SGS™ 9.1 Interact with your TouchPad™. Synaptics.com. Aug. 14, 2003. 7 pages.

A. Barletta et al.; "Video Browsing"; Nov. 4, 2003. 39 pages.

Jesse Jin et al.; "The Development of an Online Video Browsing System"; Biomedical and Multimedia Information Technology (BMIT) Group School of Information Technologies. University of Sydney, Australia. 7 pages.

Lyn Bartram et al.; "The Continuous Zoom: A Constrained Fisheye Technique for Viewing and Navigating Large Information Spaces". Graphics and Multimedia Research Laboratory, Center for Systems Science. Simon Fraser University. 9 pages.

Takeo Igarashi et al.; "Speed-dependent Automatic Zooming for Browsing Large Documents". Computer Science Department, Brown Universtity. 10 pages.

Ken Perlin et al. "Pad: An Alternative Approach to the Computer Interface". Courant Institute of Mathematical Sciences, New York University. pp. 1-11.

Shanon X. Ju et al.; "Summarization of Video-taped Presentations: Automatic Analysis of Motion and Gesture". IEEE Transactions on Circuits and Systems for Video Technology, vol. XX, No. Y, Sep. 1998.

Michael G. Christel et al. "Evolving Video Skims into Useful Multimedia Abstractions". Carnegie Mellon University. *Proceedings of the ACM CHI '98 Conference on Human Factors on Computing Systems* (Los Angeles, Apr. 1998).

Roman Jarina et al.; "Speech-Music Discrimination from MPEG-1 Bitstream". Centre for Digital Video Processing/ RINCE. Dublin City University, Ireland. 5 pages.

Aldo Hoeben et al.; "Flicking through Page-based Documents with Thumbnail Sliders and Electronic Dog-ears". Industrial Design Delft University of Technology. The Netherlands. 2 pages.

J. Calic et al.; "Temporal Video Segmented for Real-Time Key Frame Extraction". Department of Electronic Engineering, Queen Mary, University of London and Centre for Digital Video Processing, Dublin City University. 4 pages.

N.E. O'Connor et al.; "Físchlár: An On-Line System for Indexing and Browsing Broadcast Television Content". Centre for Digital Video Processing, Dublin City University. 4 pages.

Francis C. Li et al.; "Browsing Digital Video". Collaboration and Multimedia Microsoft Research, Redmond, WA and Group for User Interface Research, EECS. Dept. University of CA, Berkeley, CA. 8 pages.

Ying Li et al.; "Semantic Video Content Abstraction Based on Multiple Cues". Integrated Media Systems Center and Department of Electrical Engineering-Systems. University of Southern California. 4 pages.

Alan F. Smeaton; "Indexing, Browsing and Searching of Digital Video and Digital Audio Information". School of Computer Application, Dublin City University, Ireland. 18 pages.

Hyowon Lee et al.; "User Interface Issues for Browsing Digital Video". School of Computer Applications. Dublin City University, Ireland. 23 pages.

* cited by examiner

100a

100b

100c

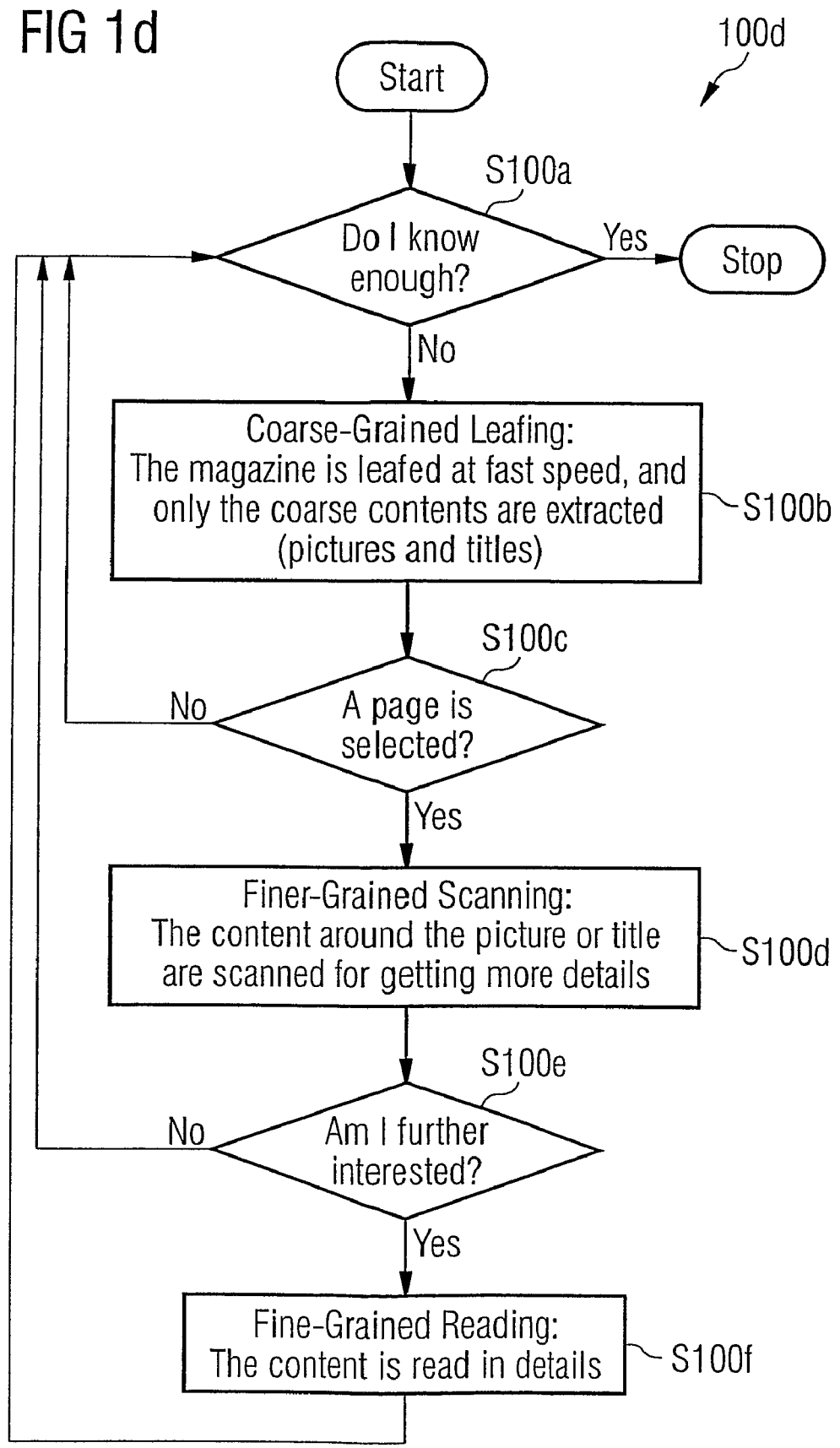

FIG 4

```xml
<video duration="[seconds]" />
<scenes number=" " >
<scene title="The Matrix" begin="0" end="89" keyframes=" " >
<summary keywords=" " >A hyperspace travel in the Matrix end up on a work recording clock</summary>
<soundtracks number=" " >
  <soundtrack begin="0" end="89" />
</soundtracks>
<dialog number="0" />
</scene>
<scene title="Trinity enters in the Matrix" begin="89" end="164" keyframes=" " />
<scene title="Trinity Free Fall" begin="164" end="263" keyframes="250-350-399" />
<scene title="Wake up Neo" begin="263" end="378" keyframes=" " >
<summary keywords=" " >Neo wakes up on the Nabuccadanasser ship. Was it a dream? Is Trinity dead? It was damn real. On the deck of the ship, Morpheus asks his new operator, Link, to confirm his own trust.</summary>
<soundtracks number=" " >
  <soundtrack begin=" " end=" " />
</soundtracks>
<dialog number=" " >
  <dialog speaker="Link" begin="356" end="357" keywords=" " >Sir, are you sure about this?</dialog>
  <dialog speaker="Morpheus" begin="357" end="358" keywords=" " >I told you, we're going to be all right.</dialog>
  <dialog speaker="Link" begin="358" end="359" keywords=" " >I understand, sir, it's just that... I'm scoping some serious sentinel activity up here.</dialog>
  <dialog speaker="Morpheus" begin="362" end="363" keywords=" " >Link</dialog>
  <dialog speaker="Link" begin="364" end="364" keywords=" " >Yes Sir?</dialog>
  <dialog speaker="Morpheus" begin="365" end="370" keywords=" " >Given your situation, I can't say I fully understand your reasons for volunteering to operate onboard my ship. However, if you wish to continue to do so, I must ask you to do one thing.</dialog>
  <dialog speaker="Link" begin="371" end="371" keywords=" " >What's that, Sir?</dialog>
  <dialog speaker="Morpheus" begin="372" end="372" keywords=" " >To trust me.</dialog>
  <dialog speaker="Link" begin="373" end="374" keywords=" " >Yes, Sir, I will, Sir... I mean, I do, Sir.</dialog>
  <dialog speaker="Morpheus" begin="375" end="377" keywords=" " >I hope so. Now re-patch the main AC to the hard drives and stand by to broadcast.</dialog>
  <dialog speaker="Link" begin="378" end="378" keywords=" " >Yes, Sir.</dialog>
</dialogs>
</scene>
</scenes>
</video>
```

400

FIG 9
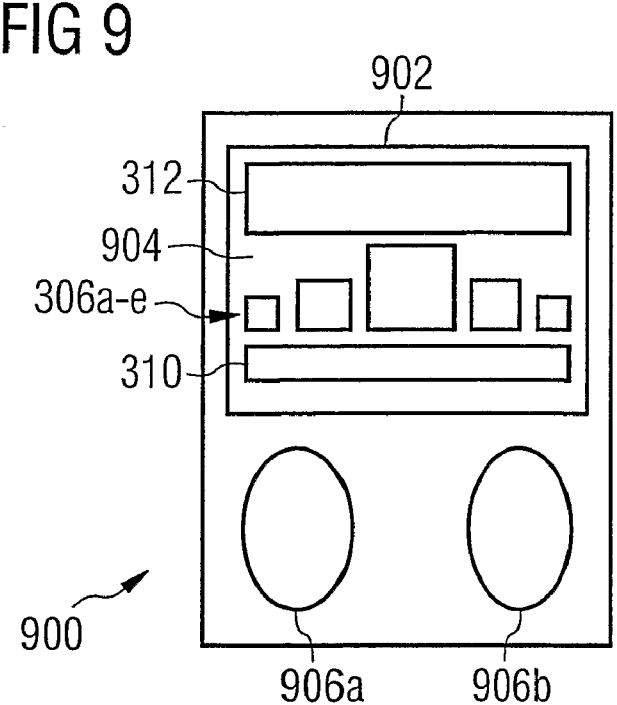
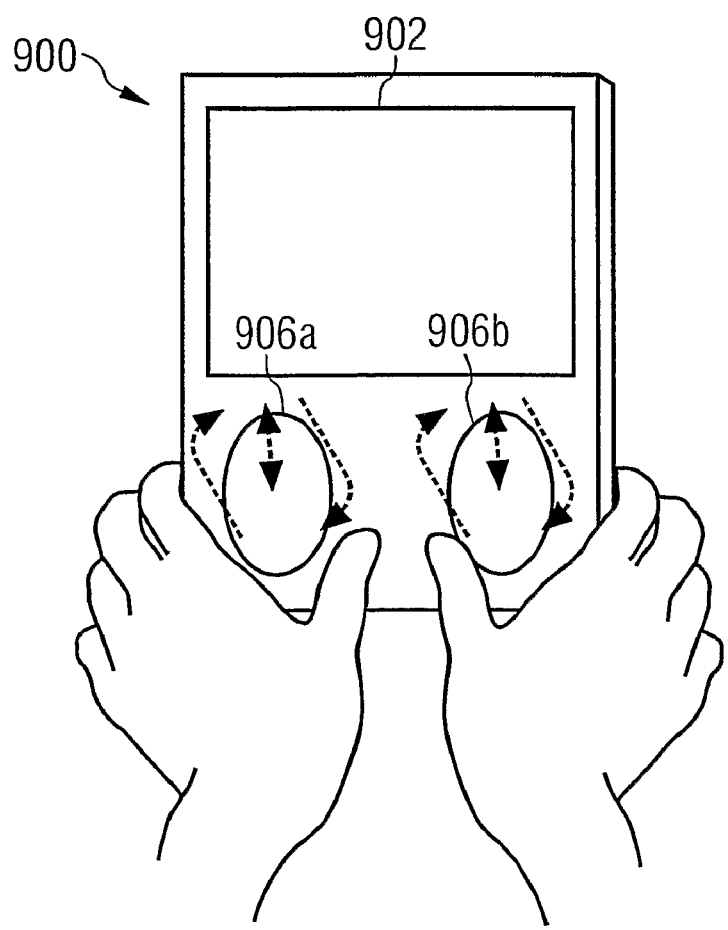

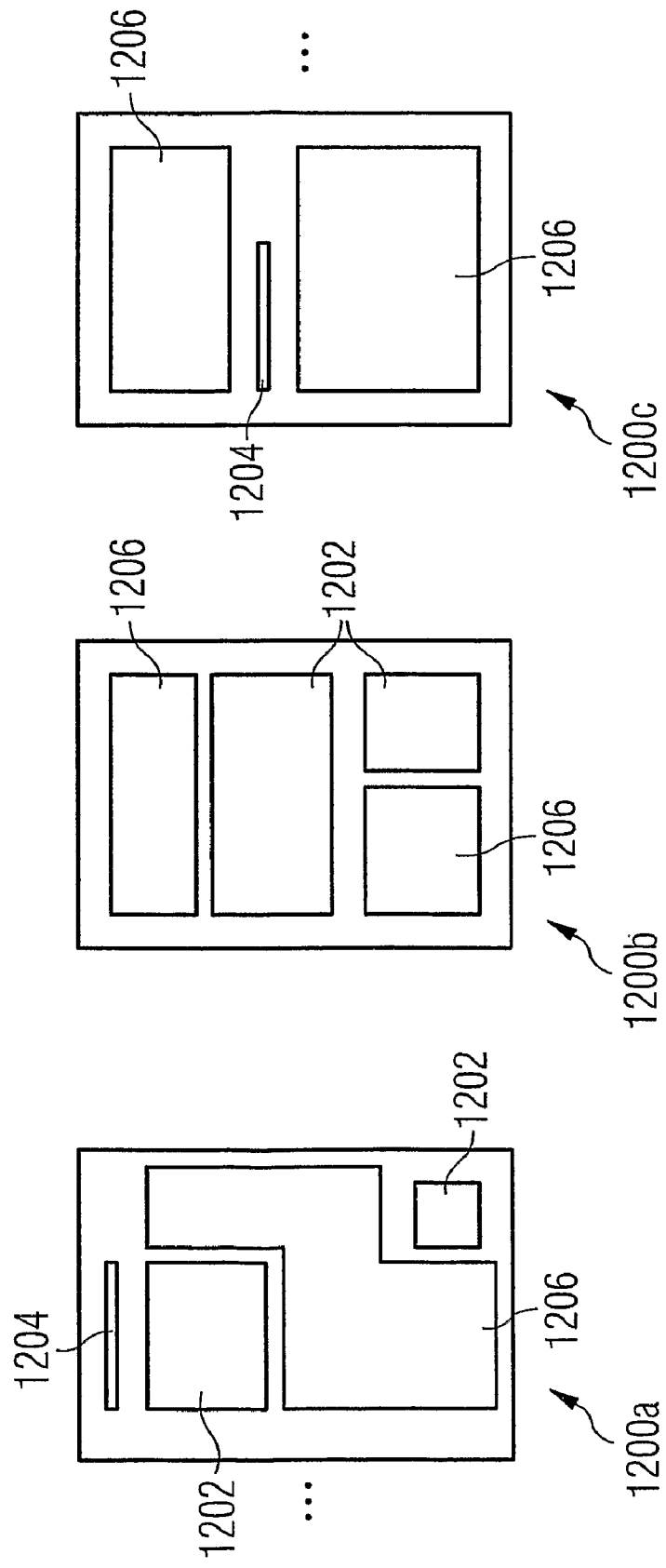

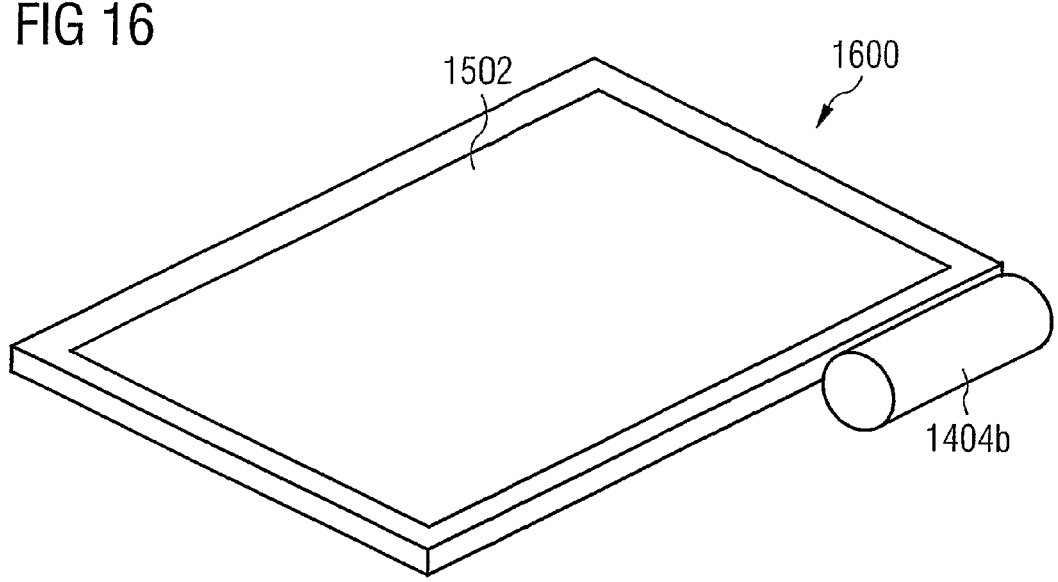

FIG 17

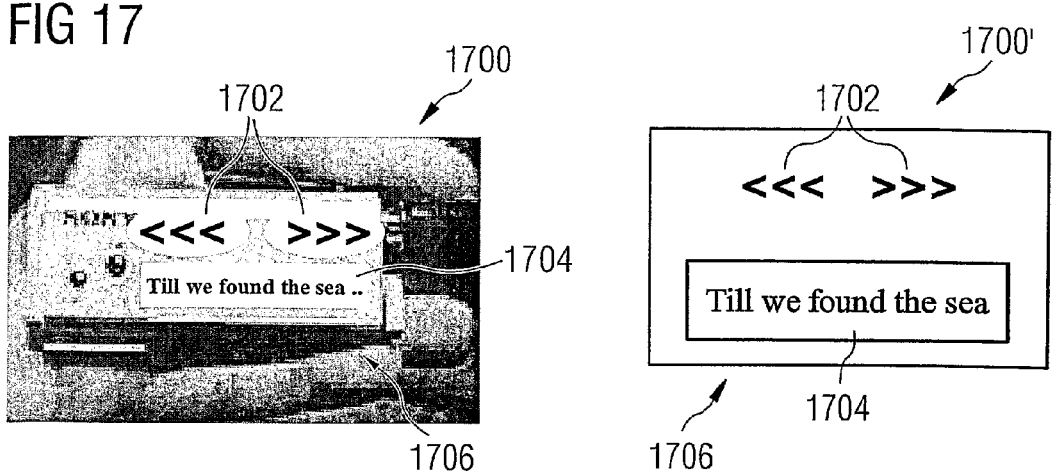

In the town where I was born
Lived a man who sailed to sea.
And he told us of his life
In the land of submarines.

So we sailed up to the sun
Till we found the sea of green.
And we lived beneath the waves
In our yellow submarine.

We all live in our yellow submarine,
Yellow submarine, yellow submarine.
We all live in our yellow submarine,
Yellow submarine, yellow submarine.

And our friends are all on board –
Many more of them live next door.
And the band begins to play.

We all live in our yellow submarine,
Yellow submarine, yellow submarine.
We all live in our yellow submarine,
Yellow submarine, yellow submarine...

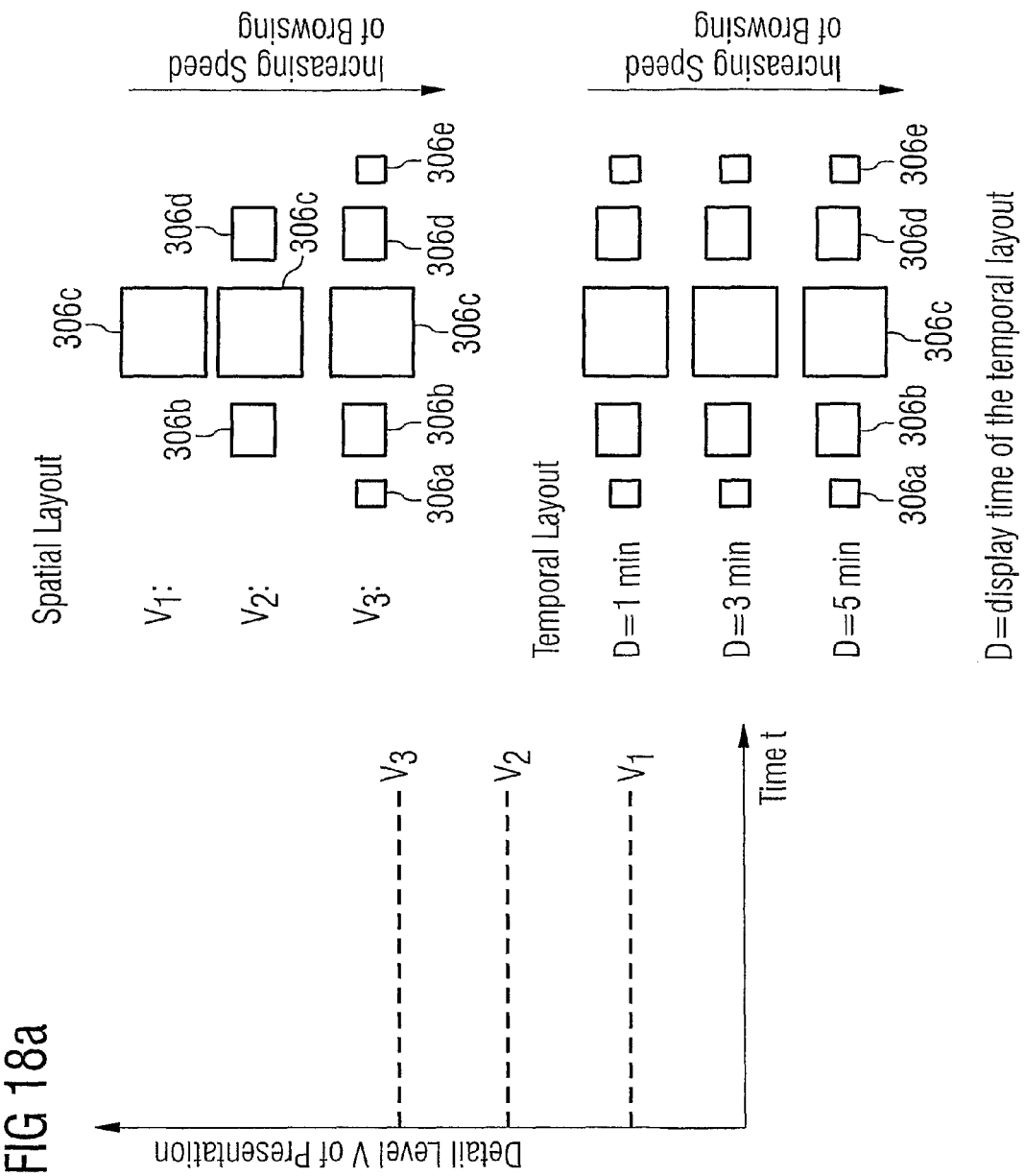

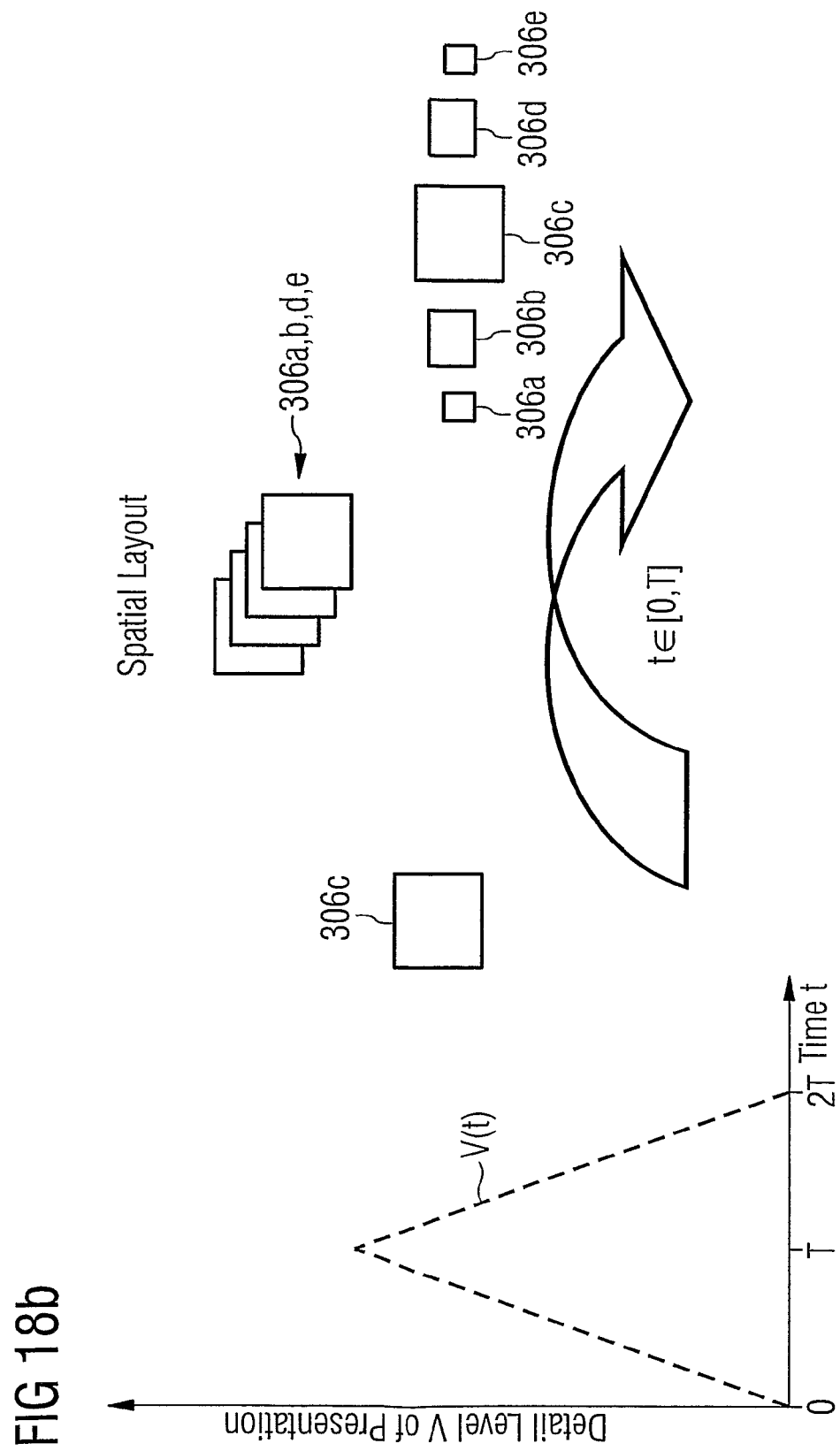

VISUALIZATION AND CONTROL TECHNIQUES FOR MULTIMEDIA DIGITAL CONTENT

FIELD AND BACKGROUND OF THE INVENTION

The present invention generally relates to the field of fast multimedia browsing. It particularly refers to different implementations of a conceptual framework which defines basic mechanisms for efficiently previewing multimedia content.

Today, the availability of digital content archives comprising huge amounts of digital multimedia data requires efficient browsing mechanisms for extracting relevant information. To avoid information overload, a browsing system needs to preselect shots of information from a database in a user-adequate manner. Additionally, such a browsing system should be able to support continuous presentation of time-dependent media. Users of browsing applications often have vague information needs which can only be described in conceptual terms. Additionally, a general browsing system must offer mechanisms for interactive inspection of the information following a user's instructions.

The use of a physical metaphor is a common strategy for designing a user interface system. For example, as described in "Multimodal Video Indexing: A Review of the State-of-the-Art" (Technical Report 2001-20, Intelligent Sensory Information Systems Group, University of Amsterdam) by C. G. M. Snoek, M. Worring, in conventional video indexing systems according to the state of the art the technique of "book indexing" is applied to the field of video browsing.

Analysis of human behavior shows that many people normally leaf quickly through the pages of an unknown magazine before buying this magazine at the news kiosk. Thereby, a combination of manual and mental processes is used to quickly browse the information contained in the magazine until reaching a certain level of understanding. Such a process can be iterated several times for reaching higher and higher levels of comprehension of the magazine's content. The "reader browsing speed" is dynamically adapted to the level of his/her interests. If the reader is interested in the content of a page, he/she can scroll around with fine-grained steps. Alternatively, if he/she is not interested in this content, he/she can jump forward or backward towards distant pages in a non-linear way, while picking up some information from the intermediate pages.

BRIEF DESCRIPTION OF THE PRESENT STATE OF THE ART

In order to understand the central idea of the invention, it is necessary to briefly explain some of the most important features of conventional video summarization, audio browsing and e-book systems according to the state of the art.

U.S. Pat. No. 5,708,767 describes a method and an apparatus for video browsing based on content and structure. Therein, a new browsing technique for extracting a hierarchical decomposition of a complex video selection is proposed, which combines visual and temporal information to capture the most important relations within a scene and between different scenes in a video, thus allowing an analysis of the underlying story structure without having a priori knowledge of the content.

In U.S. Pat. No. 5,995,095, a method for hierarchical summarization and browsing of digital video is disclosed which comprises the steps of inputting a digital video signal for a digital video sequence and generating a hierarchical summary that is based on keyframes of said video sequence.

An automatic video summarization technique using a measure of shot importance as well as a frame-packing method are described in U.S. Pat. No. 6,535,639.

In WO 00/39707 a personalized video classification and retrieval system is disclosed that allows users to quickly and easily select and receive stories of interest from a video stream.

A video-on-demand (VoD) system as well as a corresponding method for performing variable speed scanning or browsing are described in EP 0 676 878 A1.

US 2002/0051010 refers to a system for searching and browsing multimedia and, more particularly, to a video skimming method and apparatus which is capable of summarizing the full content of video files within a short period of time by skimming the content of a video file and rapidly moving to a desired section.

EP 1 205 898 A2 pertains to computer-implemented techniques for improving reading proficiency. Thereby, a segment of text is displayed on a video screen.

GB 2 322 225 is directed to a continuous search method and apparatus for searching among discontinuously recorded sheets of photo information, which are recorded in a digital recording medium (e.g. a digital video cassette recorder).

U.S. Pat. No. 5,847,703 refers to a method and apparatus for browsing through a motion picture in order to locate desired segments in said motion picture.

A method carried out in an image processing system for selecting text and image data from video images is disclosed in U.S. Pat. No. 6,178,270.

PROBLEMS TO BE SOLVED BY THE INVENTION

Today, the increasing amount of digital multimedia content (video, audio, and text data from movies, Web pages, e-books, audio and video files, etc.) is opening up a vast range of problems and challenges related to the consumption of multi-media content. One of the major problems is how to quickly browse through digital multimedia content for getting an impression or a digest of the contained information in a short time since browsing and making a digest of digital multimedia content is generally very time-consuming. Up to now, however, most of the presently available automatic or semi-automatic video summary systems feature many limitations:

poor computer-based user interactions and use of non-intuitive GUI paradigms,
high computational complexity (especially when complex extraction algorithms are applied, which are often restricted to a specific content type),
focus on either preview or digest,
too long preview time, and
poor modeling of user preferences.

OBJECT OF THE PRESENT INVENTION

In view of the explanations mentioned above, it is the object of the invention to provide users with a visual/manual frame-work for enabling an efficient and intuitive way of previewing digital multimedia content.

This object is achieved by means of the features of the independent claims. Advantageous features are defined in the subordinate claims. Further objects and advantages of the invention are apparent in the detailed description which follows.

SUMMARY OF THE INVENTION

The proposed solution is dedicated to different implementations of a multimedia preview system for quickly and interactively browsing digital multimedia content (video, audio, and/or text data) with the aid of a user-driven, speed-dependent browsing process. In this connection, a conceptual framework is introduced which defines basic mechanisms for a "leafing through" of multimedia content (e.g. the content of an electronic book, a digital video or a digital audio file). Said system thereby provides a user interaction model emulating the intuitive manual and mental process of leafing through the pages of a book or an illustrated magazine. The system thereby provides special navigation patterns either for previewing digital multimedia content or having a quick digest.

This includes a dynamic presentation scheme of the digital content depending on the speed of browsing and different semantic levels, an effective and intuitive manual user interaction pattern and a non-linear navigation pattern for emulating coarse-grained page leafing. In this context, the expression "semantic level" is used to identify possible abstract representations of the same digital content carrying different amounts of information. For example, a simple text can be represented with different semantic levels: title, captions, key words, etc., all carrying different parts of the entire information. In case of video data, the herein proposed solution provides a more neutral and personal way of browsing and trades off the complexity of conventional video extraction algorithms according to the state of the art by providing a higher level of user control.

According to the invention, a "semantic zoom" functionality, the usage of multiple information modes and natural user interaction are combined. Semantic zoom on content is defined as the possibility of visually providing information with different degrees of importance for the full understanding of the content itself. While information contained in a video or a book is normally provided by using redundant media, e.g. text, pictures, moving pictures, etc., semantic zoom is a technique which depends on the required degree of details representing the minimum non-redundant subset of information in a large information container.

Said multimedia preview system can be realized as a video-on-demand system with an additional video browsing functionality for varying the speed and detail level of presentation depending on type and/or frequency of user commands instructing the multimedia preview system change the speed of browsing such that said detail level is the higher the lower the speed of presentation and vice versa.

One possible implementation of the proposed multimedia preview system works by decomposing the content of e.g. a digital video or audio file, assigning segmented parts of said content to different speeds of browsing representing different levels of detail and controlling the speed of browsing. However, it is important to note that—in contrast to WO 00/39707 and US 2002/0051010—the proposed multimedia preview system according to the present invention does not depend on semantic analysis tools such as shot and scene detection means. Instead, said file is temporally compressed by cutting out several parts of a video sequence, and the speed of scrolling the visualized information can be controlled by a user. Thereby, said user has the possibility to interactively control two parameters at real time: the playback speed and the size of the video sequence that has to be temporally compressed. The intention of the proposed system is to give the user an impression of the content without trying to "hide" uninteresting parts such that the user can decide by himself whether said content is interesting or not.

In contrast to EP 0 676 898 A1, the data segments played back by the proposed multimedia leafing system are much larger than typical MPEG-2 GOFs. Moreover, the segmentation is not based on the kind of compression technique used in MPEG. It should further be noted that the segments itself are played in another speed than the normal playback rate.

The fundamental approach of the present invention is not to define any particular assumption regarding user preferences or content type but to provide a multimedia preview system that enhances a user's capability of browsing digital content, fully controlled by the user itself.

BRIEF DESCRIPTION OF THE DRAWINGS

Further advantages and embodiments of the present invention result from the subordinate claims as well as from the following detailed description of the invention as depicted in the accompanying drawings:

FIG. 1d is a flow chart illustrating an algorithm which approximates the mental process of a person while leafing through an illustrated magazine, FIG. 9 shows a DVD cover with integrated display capabilities which can be used as a human-machine interface for remotely controlling a video preview system, FIGS. 12a-c show three schematic layouts of an electronic paper consisting of different frames for displaying pictures, titles and body text, FIG. 16 shows a three-dimensional schematic view of an electronic book device having a touch-sensitive surface for inputting control information needed to increase or decrease the speed of browsing and/or the detail level of presentation to be displayed through the pages of the electronic book, FIG. 17 shows a graphical user interface of a client terminal running an application program for controlling an audio player downloaded from an application server in a client/server-based network environment, FIG. 18a is a diagram illustrating a speed-dependent spatial-temporal-semantic information layout, and FIG. 18b is a diagram showing a non-linear 'long' displacement action with a dynamic spatial-temporal-semantic information layout

DETAILED DESCRIPTION OF THE PRESENT INVENTION

Figure 1A:
FIGS. 1a-c show different types and speeds of leafing through an illustrated magazine.

In the following, embodiments of the present invention as depicted in FIGS. 1a to 18b shall be explained in detail. The meaning of all the symbols designated with reference numerals and signs in FIGS. 1a to 18b can be taken from an annexed table.

Figure 1B:
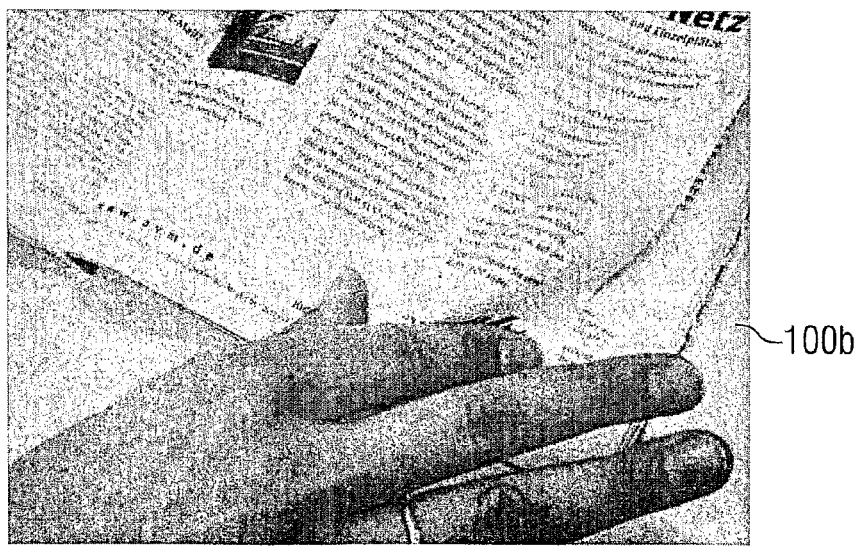
Figure 1C:

FIGS. 1a-c illustrate both the mental and manual process of a reader when leafing through the pages of an illustrated magazine. Thereby, said reader focuses on different parts of a page, mentally filters the information displayed and, depending on his/her particular degree of interest, browses the content of the magazine in a quicker or slower way, respectively.

A flow chart which models this leafing process is depicted in FIG. 1d. Thereby, said reader spatially focuses on different elements of a page (picture, titles, subtitles, etc.) and navigates pseudo-randomly following his/her interests. In such a way, said reader can browse a large quantity of information in a quick and easy way.

The process of mentally filtering is also driven by different kinds of content and structure of the displayed pages themselves: For example, pictures are faster to interpret than textual information, titles and subtitles are more easier to read than body text, and so on. Thereby, said process can be supported by using the fingers for reading a magazine line by line. However, navigating through the pages of a magazine is more sophisticated, which means that the navigation process does not proceed with simple patterns (such as e.g. patterns for controlling a video cassette recorder). By observation, different types of navigation patterns in leafing through an illustrated magazine can be identified: scrolling slow, scrolling fast, skipping to different pages, backward and forward acceleration, etc. There is not a fixed maximum time or any fixed spatial layout to go through the information, but the user itself gives pace to the navigation procedure by following pseudo-random paths.

Such a process can be generalized and applied to different digital content. The focus here on "digital" stresses the fact that digital data can easily be manipulated for different purposes by means of automatic algorithms.

A digital video can easily be separated in different simpler composing information channels: video scenes can be represented by picture frames, audio can be classified in several types (speech, music, silence), etc. Additionally information can be transformed by using alternative surrogates depending the level of "interests/details" or the speed of browsing.

A first embodiment of the present invention refers to the use of said leafing model in a video preview system. For this purpose, it is necessary to divide a video stream to be previewed into its elementary objects (frames, text, and sound samples), thereby providing different abstraction/detail levels of presentation. ("semantic degrees"). Said objects are then extracted on a time-base scale. Initially, no effort is spent to extract semantically meaningful objects (e.g. scene/shot boundaries, see FIG. 2). For example, main frames can be extracted every 2-3 minutes and other frames every 15-20 seconds. These two groups represent two semantic zoom levels for the visual information to be displayed, because they give the user a partial semantic "window" on the content itself. Dialog text and scene commentary, which represent two further semantic levels, are synchronized with the visual content.

Thus, different information representations are grouped into three semantic spatial layouts: coarse-grained (keyframes and text summary), middle-coarse (other frames and dialog text) and fine-grained layouts (sound activated).

The user can at any time select full video playback. During the quick browsing the information is dynamically displayed with a variable semantics layout depending on the user's browsing speed. For example, in a long-jump transition the user is shown only a few keyframes in a slide show mode and only summary keywords. Combinations of browsing speeds and information layouts are used, especially in case of non-linear backward/forward jumps through a video sequence.

Figure 2:
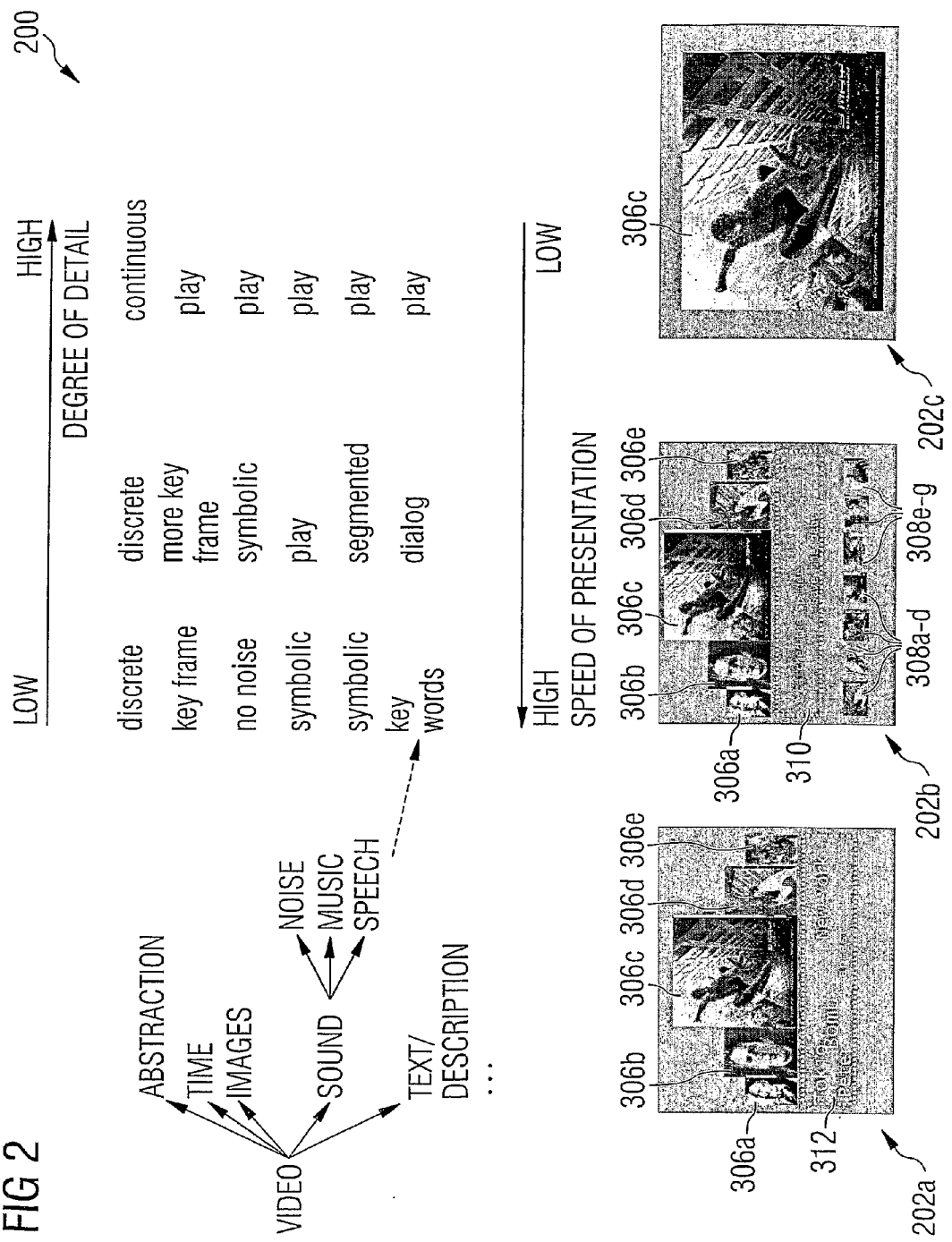
FIG. 2 illustrates the process of multimedia decomposition.

FIG. 2 illustrates an example of a multimedia decomposition process according to the present invention, which is applied to the content of a video sequence presented by a multimedia preview system. Said preview system features a "multimedia semantic zoom" function according to the present invention offering different speeds and detail levels of presentation in text and/or image which can be selected by a user to quicker or slower browse the content of said video sequence, wherein the detail level is the higher the lower the speed of presentation and vice versa.

The "semantic zoom" function provides a user with different views of requested multimedia information (videos, electronic books, audio files) depending on the needed degree of details. For example, a magazine as a container of information can be represented with subsets of the contained information depending the degree of details the reader wants to have. A video can be represented in time, space, quality, etc. with different alternative subsets of the information it contains. The semantic zoom ranges from the full content (e.g. playback of a video, reading a book page by page, etc.) to a variable lower detail level of presentation providing simplified surrogates of information (pictures, text, audio samples, etc.). The final goal is to give to the user the capabilities to associate the degree of required details and the speed of navigation.

One embodiment of the present invention pertains to a method for browsing the content of requested multimedia data to be previewed, said content being displayed on a client terminal 1006 accessing a multimedia server 1002 which holds said multimedia data. After having downloaded (S0) said multimedia data from the multimedia server 1002 to said client terminal 1006 via a network link, said multimedia server 1002 receives (S1a) and processes (S1b) user commands demanding a change in the speed of browsing and/or in the abstraction level of presentation, in the following referred to as "representation parameters". After that, said multimedia data are decomposed (S2) into non-redundant and redundant, less relevant parts according to an offline image and/or text segmentation algorithm. These representation parameters are then adapted (S3) by online filtering out (S3') a certain amount of said redundant, less relevant parts depending on type and/or frequency of said user commands such that the degree of presented details is the higher the lower the speed of presentation and vice versa. Finally, an adapted version of said multimedia data is displayed (S4) on said client terminal 1006.

Advantageously, metadata of any kind allowing users to identify segmented parts of multimedia data to be previewed are associated (S5a) to said multimedia data. Thereby, said metadata have to be synchronized (S5b) with said multimedia data.

The proposed "leafing model" is completely different from conventional indexing methods. While books, due to their textual nature, are easily browsed through summary and indexes—which is the base of conventional video summarization techniques according to the state of the art—, the multimedia nature of video content imposes big limitations to such a technique.

For implementing a system similar to the classical "leafing model" for a video content, the video information has to be separated in its elementary components. In the following, this decomposition and semantic zoom approach is described in detail as an introduction to the proposed implementation.

Different keyframes are used to quickly browse visual content: While several systems have been introduced for keyframe detection/selection, the proposed system uses a combination of user interactions and constant-interval selection. The system described here selects different keyframes at constant temporal distance for easing the selection process and uses a user's capabilities to grow through a large amount of information.

The nature of video artifacts implies that into a single interval of duration D (e.g. 2 minutes), every frame can statistically be used as a representative frame due to the fact that the video information does not change abruptly. In mathematical terms this can be described as follows:

"In a slowly changing function y=f(x), a value $f(x_0)$ can be used as an approximation of f(x) in an interval [x, x+D], wherein D is chosen small enough."

The loss of information in quickly changing video scenes is neutralized by the usage of several redundant information modes (text, colors, etc.).

Other new or traditional techniques can also be applied for keyframe detection, thereby taking into account an increase in processing time, which can harm the possibility of proceeding at real time. The time interval D can vary depending on the speed and frequency of user commands.

According to a further embodiment of the invention, audio components of a video film are reduced to audio samples (e.g. very short samples of a soundtrack, speech samples, etc.), and speech components of said video film are provided using textual surrogates on simple semantic levels, said surrogates being an equivalent to titles and subtitles while reading a magazine. The user, in some cases, is interested to a very general overview of the information currently browsed such that it is sufficient to present information on a higher level of abstraction by neglecting details.

Different levels of textual information can be provided depending on the complexity of the video content: For example, in a reportage or university lesson video only the textual speech of the speaker can be provided, while in a movie a general summary of video intervals or going to a much more fine-grained levels with dialogs or sound samples can be provided.

In the visual and textual domain different degree of semantic zooms can be provided, e.g. by using key words or different picture qualities.

Figure 3:
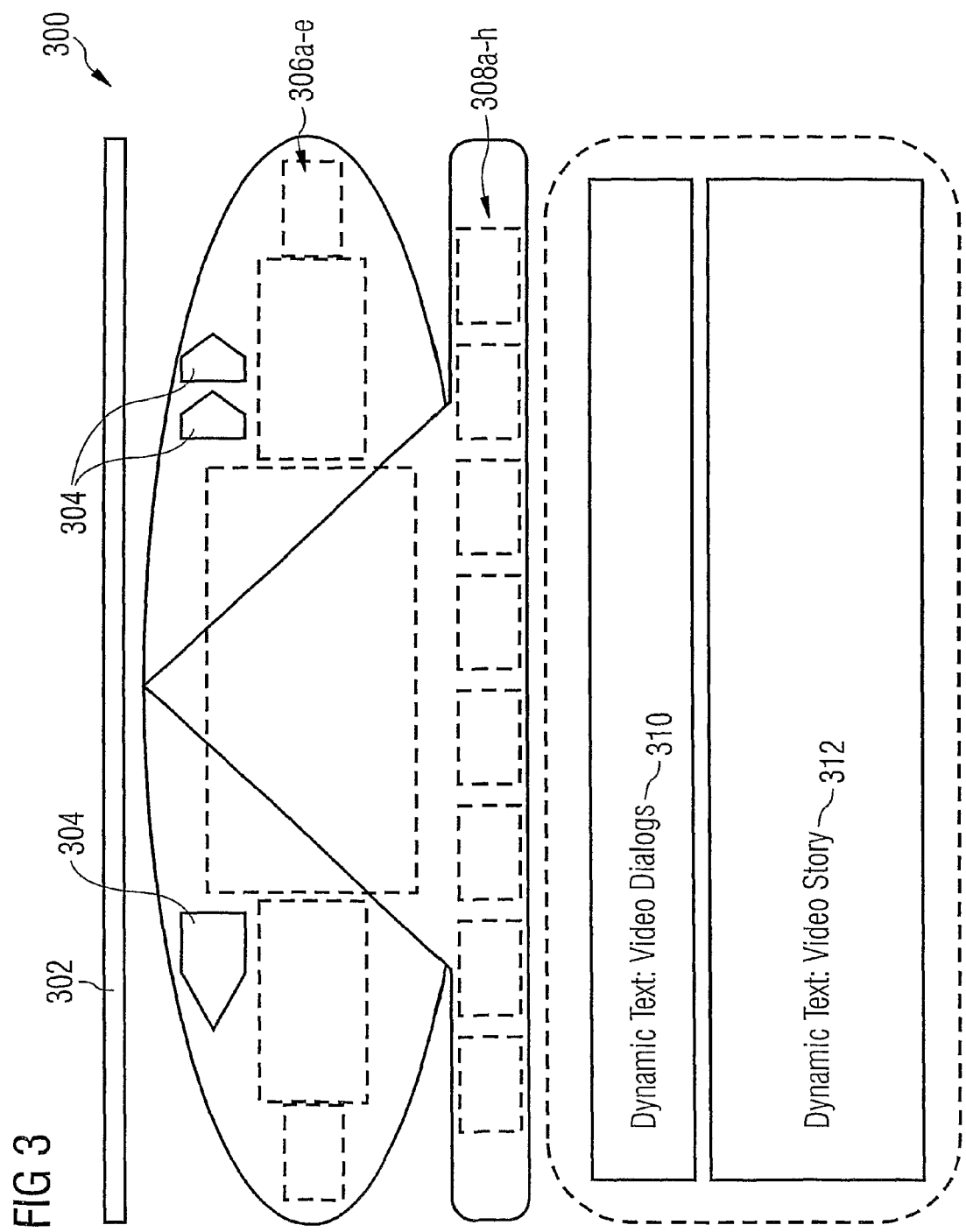
FIG. 3 shows a schematic example of a spatial layout having different detail levels of presentation for the content of a video sequence to be previewed in text and/or image.

Once having separated all the main components, the information is structured in order to help the user to focus on different degree of semantics. Then, a spatial layout showing different detail levels of presentation for the content of a video sequence to be previewed as depicted in FIG. 3 (a so-called "static layout", because it is presented to the user while no interaction is performed) can be defined. The spatial collocation of the information helps the user to focus on different levels of details.

As shown in the example depicted in FIG. 3, two main areas can be defined: a coarse-grained one 306a-e and a fine-grained one 308a-h. The first area consists of a collection of N keyframes 306a-e, wherein an interval T of approximately two minutes represents a large video interval. textual areas 310 and 312 are added where e.g. a very general textual summary of the corresponding keyframes is displayed. In this case an alternating "semantic zoom" is reproduced between the visual information and the textual one. The approximation of such information is reinforced by the redundancy introduced by text and images. In the keyframe area 306a-e a perspective technique is used to focus the main attention to a single frame. At the same time the user has a temporal view on a video interval having a total length of N·T.

The fine-grained area 308a-h features the same pattern but with a smaller sample time interval (e.g. 30 seconds), and it refers only to the time interval of the main keyframe (see FIG. 3). The textual information has a more detailed view on the information: For a movie this can be associated to dialog text 310, for a reportage to a speaker's voice transcription, etc.

The space allocated to each area should be proportional to the carried degree of semantics: In the proposed system more than 50% of spatial space is given to the highest semantic level, that is the coarse-grained visual area 306a-e (see FIG. 3). Other values can be used or manually set by the user. Such distribution of the spatial layout can be done automatically depending the user navigation patterns (fast, slow, etc.).

Other information can be shown by using alternative surrogates: For example, audio dynamics can be shown by using colors on a navigation bar. The sound of a movie is present in such a layout, although it is not spatially displayable: If the user maintains the focus on the current displayed layout for a time Δt (e.g. 10 seconds), a soundtrack is offered that characterizes the current displayed video time interval. Thereby, a user can automatically or manually activate the video playback that represents the full video information (maximum semantic level).

The dynamic behavior of the system described in this patent application is of fundamental importance. Starting from the dynamic analysis of "magazine leafing", the importance shall now be emphasized to have a more intuitive navigation pattern. Such a navigation pattern should map to the fuzzy behavior and capabilities of leafing a magazine with "digital fingers".

FIG. 6a shows different input and navigation control devices 602a-c which can be used as human-machine interfaces for previewing a video sequence, said devices including a three-key touch pad display 602a serving as a human-machine interface for navigating through a list of symbols for playing, slow/fast scrolling or skimming a video sequence, a rolling mouse 602b serving as a human-machine interface for performing the aforementioned navigating actions and a remote control device 602c having control keys for executing functions of a video cassette recorder (e.g. playing, fast forwarding and fast rewinding a video sequence, pausing or stopping a video playback, etc.). FIG. 6a further shows a variety of navigation actions executable by said devices which are used to control the speed and acceleration of browsing. Thereby, speeding up and accelerating have a corresponding result on the envisioned information.

In this connection, each action is associated to a specific "semantic level", which means the information displayed can be prioritized depending on the respective abstraction level of presentation, e.g. such that the degree of presented details is the higher the lower the speed of presentation and vice versa. Whereas text data can easily and quickly be visualized and read by the user, audio data are not easily reproducible during a quick browsing. For example, during a fast browsing all the information displayed in the "static layout" are reduced to maintain a higher abstraction level of presentation, which means that a presentation layout showing only a few details is displayed. FIGS. 7a-d show four diagrams illustrating the dynamic presentation layout during a browsing process, wherein the speed and detail level of presentation in text and/or image is varied depending on user commands instructing the video preview system to quicker or slower browse the content of said video sequence. For example, the static layout can be simplified for focusing on more coarse-grained details.

It is also part of the dynamic behavior of the proposed multimedia preview system to dynamically change the spatial, temporal and semantic parameters of the system. For example, textual information is changed to keywords. Thereby, a user can zoom semantically over a text area both on physical dimension (bigger fonts) and semantic dimension (keywords). Moreover, the time intervals used for selecting the picture frames can vary following the speed and/or frequency of user commands.

A user input device which is deployed for entering a user's navigation commands for remotely controlling a multimedia preview system should be able to intuitively map entered commands to programmed navigation actions to be executed by said preview system (e.g. actions changing the speed of browsing). For example, a touch pad display 602a as depicted in FIG. 6a can be used for navigating through a list of symbols for playing, slow/fast scrolling or skimming a video sequence. This technology can be used in addition to all kinds of devices capable of enabling a "leafing" action in an intuitive way, especially bendable user interfaces allowing continuous input actions by using e.g. the fingers. Bendable user interfaces have been realized (see FIGS. 8a-f). FIG. 8a shows that slightly bending such a bendable PDA 800a calls a programmed function of the preview system (e.g. to zoom in or out a virtual map 800c-e displayed on an integrated display 802a). Another prototype is realized as a credit-card sized display device 800b (a so-called "tourist browser") with an integrated navigation system as depicted in FIG. 8b. This device comprises a variety of piezoelectric sensors detecting the card being bent up or down.

The system described above can also be used e.g. for promoting video digital content. This can be achieved by e.g. implementing the navigation mode described above on Web sites. Another approach is to use DVD covers with integrated display capabilities as human-machine interfaces for remotely controlling a video preview system according to the present invention (see FIG. 9).

All the extra information needed to run a system as described above can automatically be retrieved from e.g. movie transcripts, director storyboards, etc. or extracted from e.g. a video source (e.g. by performing a speech-to-text extraction, etc.). Such a set of extra data can be embedded in the movie or delivered separately. In the scope of the present invention a movie transcript is used as a data source for additional textual information, because they are easily available and can easily be processed.

Figure 4:
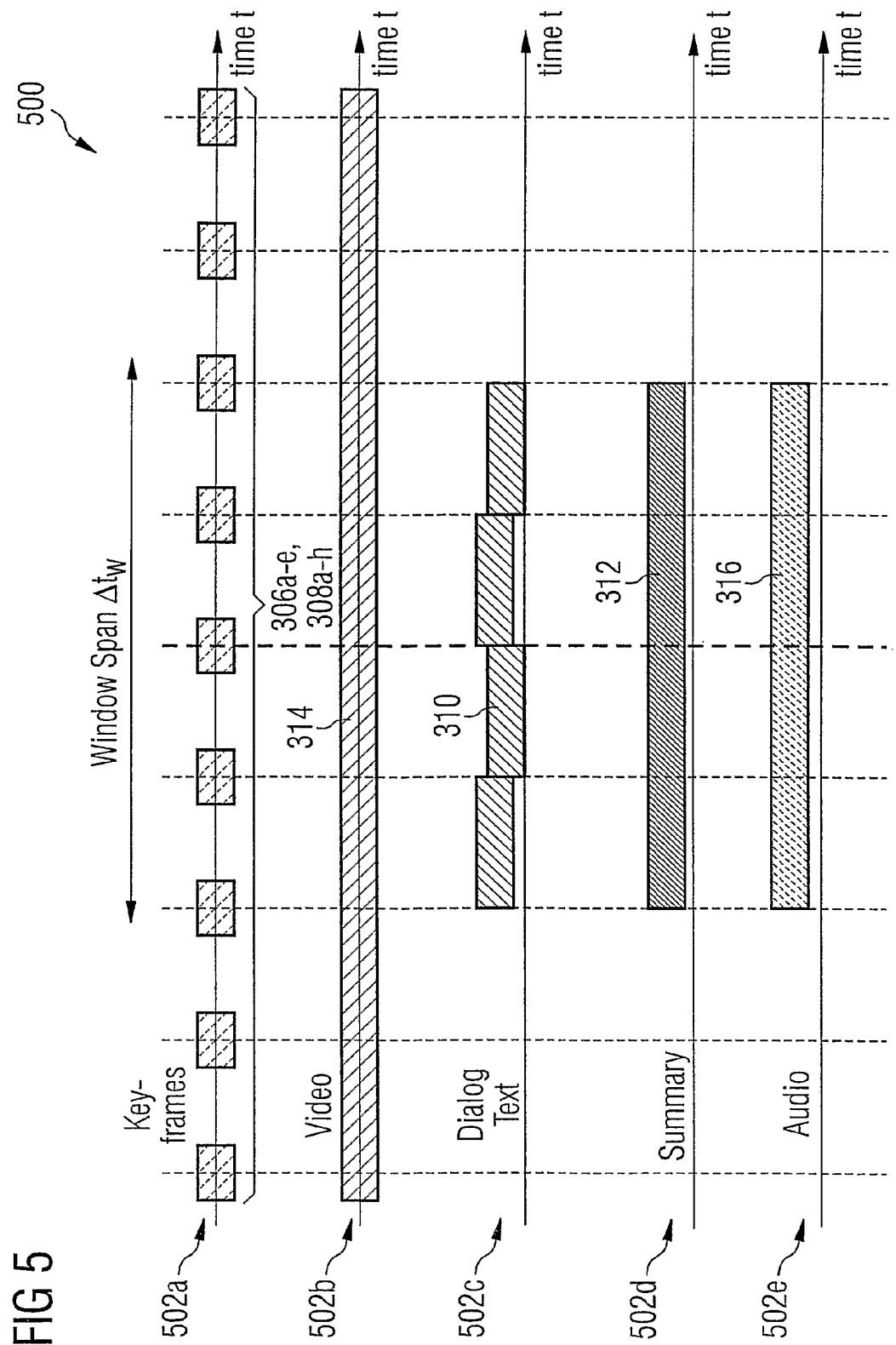
FIG. 4 is a program sequence showing an XML-based representation of metadata which is used for browsing the content of multimedia data to be previewed.

According to one embodiment of the invention, all the extra information is embedded in an XML file, separate from the video content. In this case, it is more useful for backward compatibility with old video content and it is more suitable for network delivery. A program sequence showing an XML-based representation of metadata which is used by the multimedia preview system according to the present invention for browsing the content of multimedia data to be previewed is shown in FIG. 4. In this way, information is introduced that can easily be extracted by already existent sources (e.g. dialogs, summary, soundtrack, etc.). This information is then structured with the aid of an XML tree. Thereby, said metadata are used to support the navigation and the semantic zoom process.

Figure 5:
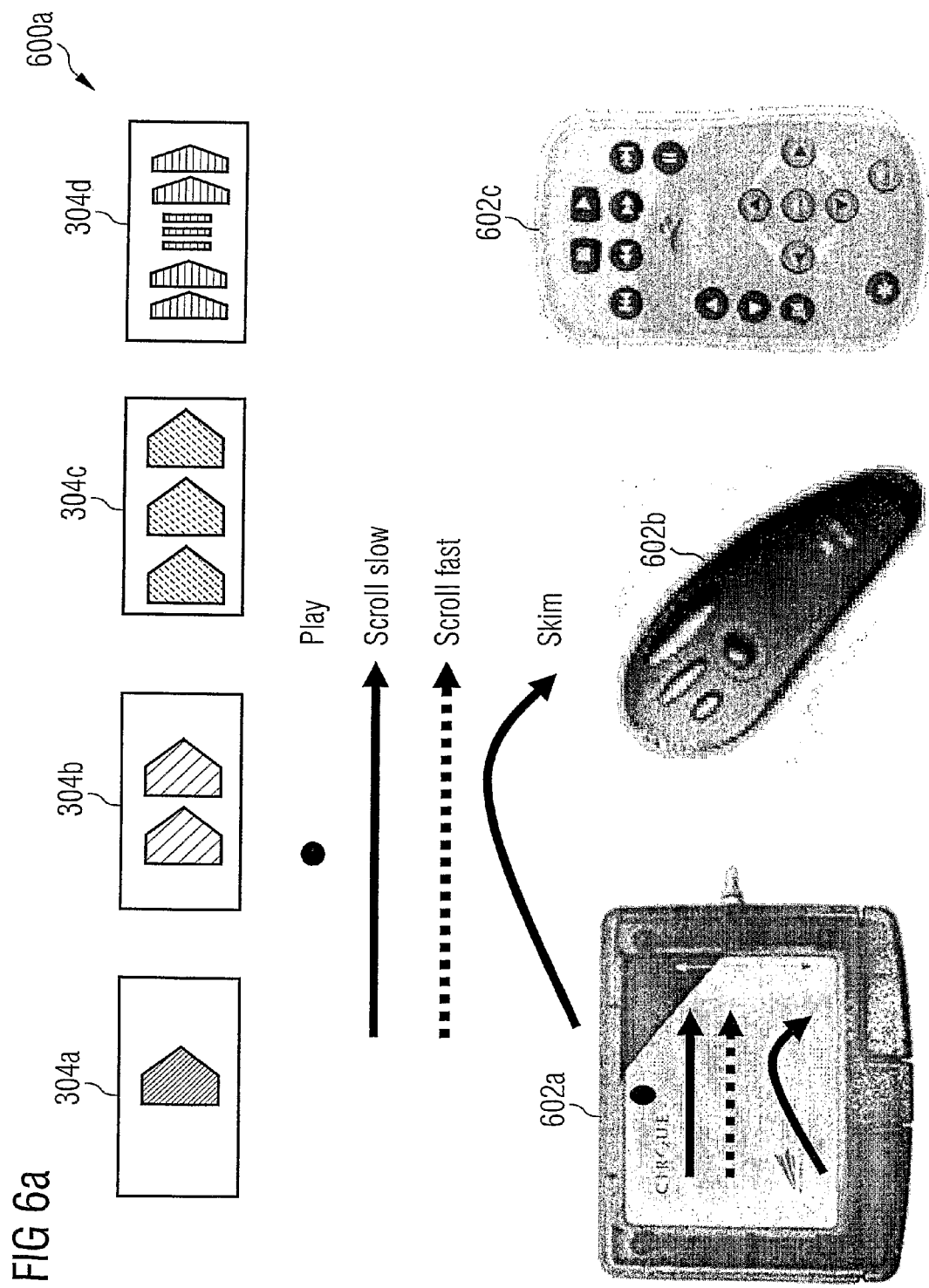
FIG. 5 is a timing diagram of a virtually structured movie.
Figure 6:
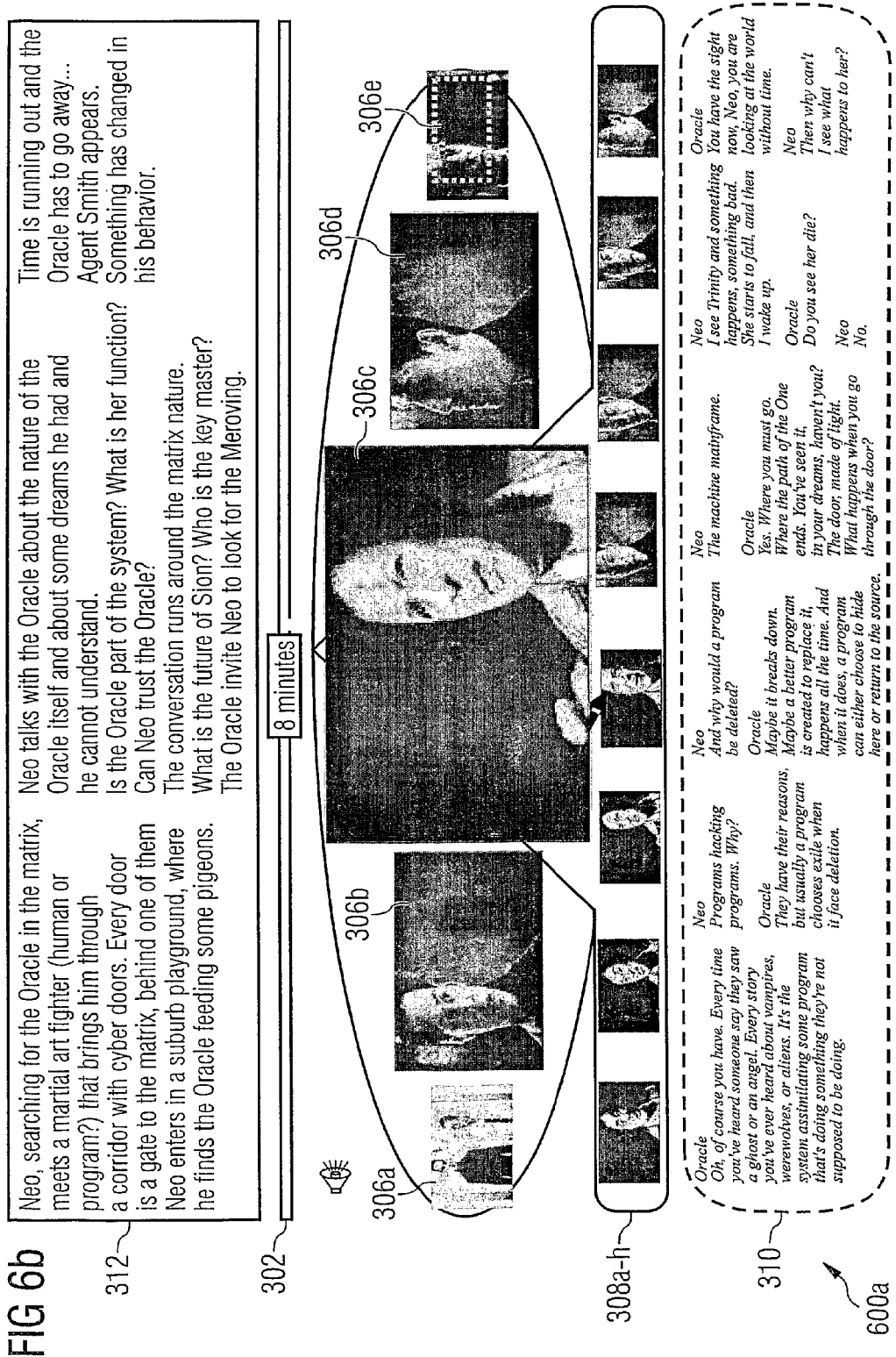
FIG. 6a shows three input and navigation control devices which can be used as human-machine interfaces for previewing a video sequence.
FIG. 6b shows an example of browsing through a video sequence by using the "semantic zoom" function offered by a video preview system according to one embodiment of the present invention.
Figure 7:
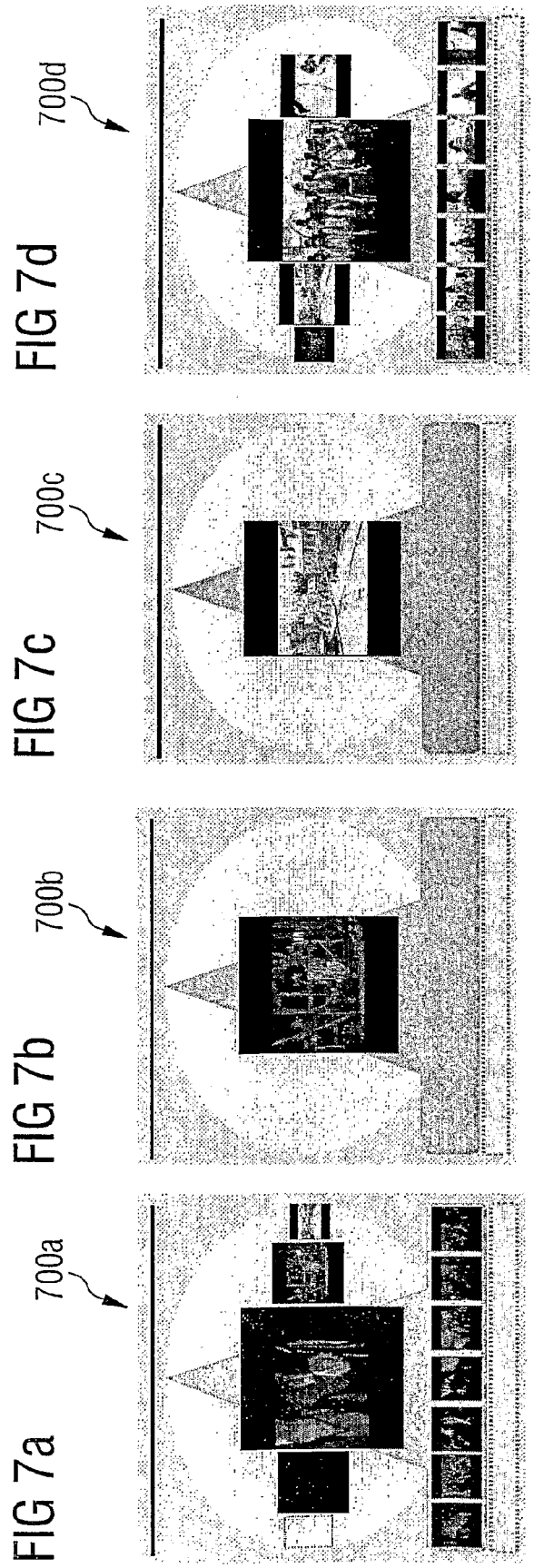
FIGS. 7a-d are four diagrams illustrating the dynamic presentation layout during a browsing process.
Figure 8:
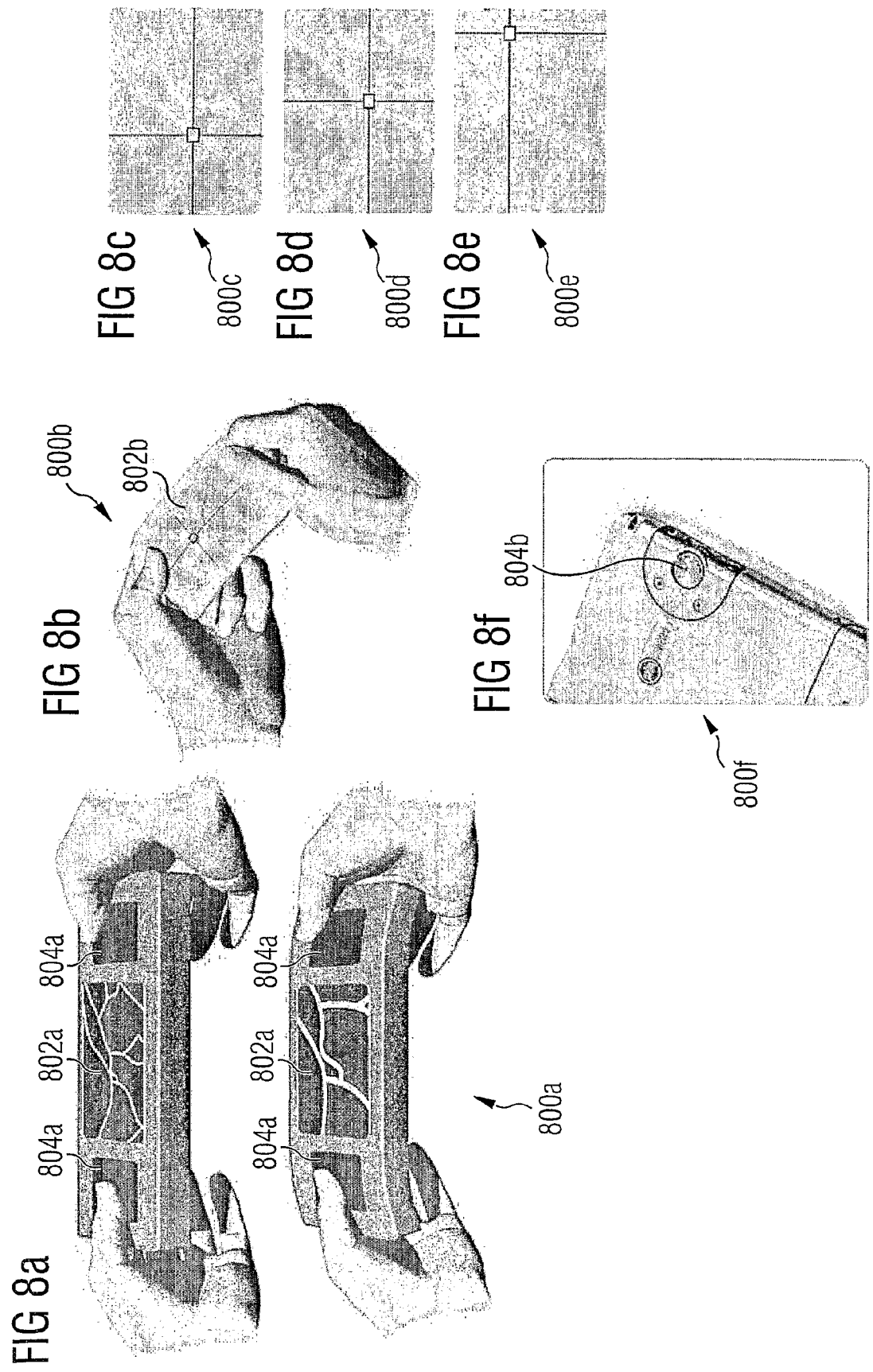
FIG. 8a shows a bendable PDA which can be used as a human-machine interface for remotely controlling a video preview system.
FIG. 8b shows a credit-card sized display device with an integrated navigation system.
FIGS. 8c-e show different detail levels of a virtual map displayed on an integrated display of the bendable PDA or credit-card sized display device, respectively.
FIG. 8f shows the rear side of the credit-card sized display device with an integrated touch pad.
Figure 10:
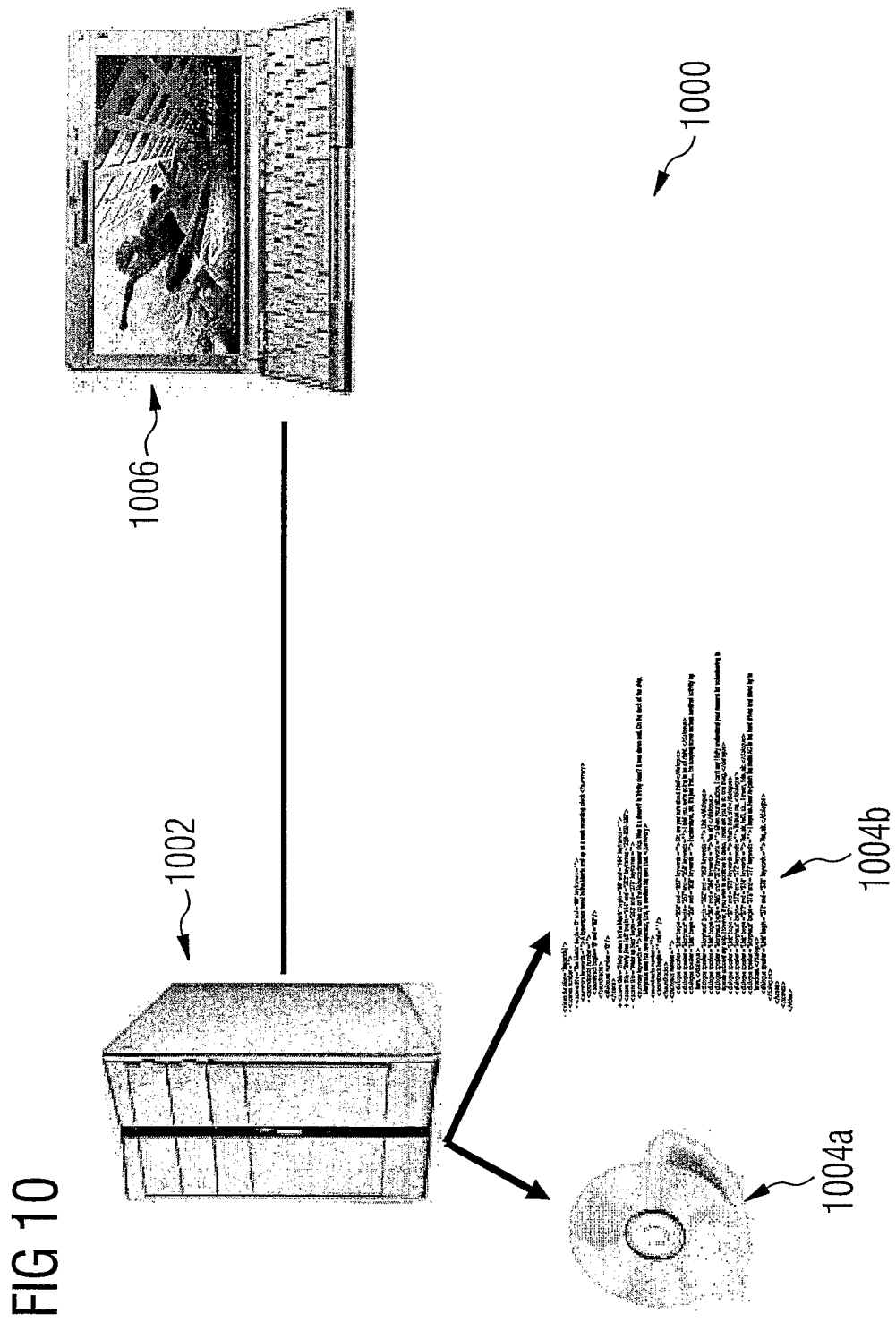
FIG. 10 shows a multimedia preview system in a client/server-based network environment for browsing the content of requested multimedia data to be previewed.

Applying the above-described techniques results in a video "virtual" structure (see FIG. 5) with different detail levels of presentation. As shown in FIG. 5, video content can be structured in a way to facilitate the previewing procedure. The multimedia preview system therefore provides a quick overview within a time span of e.g. 8 to 10 minutes where information can be shown using different "multimedia modes". It is shown that a virtually structured movie (consisting of video frames, summary, dialogs, etc.) can be previewed only within a time window of a predefined size. Thereby, only information contained in this window is presented to the user, e.g. a single page of an electronic book.

The proposed multimedia preview system for browsing the content of requested multimedia data to be previewed works according to a straightforward approach using two separate data sources: one is the video itself, and the other is a general data container with all the information needed for the navigation mode: keyframes, textual information (e.g. dialogs, video summaries), additional sound samples, etc., which are formatted e.g. by using XML files (see FIG. 4).

Thereby, a client application downloads and uses the latter data container for executing the major navigation steps. Whenever a user decides to playback a movie, an Internet video server is requested to deliver the video stream. This solution is fully back-compatible with old movies that do not contain any extra information and with movies having different formats. As shown in FIG. 5, metadata needed for said navigation actions can be transmitted separately or embedded in an original multimedia format: Once a user is remotely accessing and leafing requested multimedia content, he/she can access the full information by using a traditional multimedia Web server.

Electronic book, electronic ink, electronic paper as well as Web page devices are all examples for digital substitutes of traditional literature such as books, magazines, and newspapers, etc. The digital format of these hand-held computer devices for displaying electronic literature increases the flexibility and the overall potentialities of a traditional text preview system: Embedding multimedia objects, screen adaptation and hyper linking are just a few examples of what can be done when using this digital format.

The physical realization of electronic literature has the major drawback of limiting the traditional way of interacting with the paper media: Traditional books can be leafed, manipulated, bent, etc. In the near future many kinds of traditional paper content will also be provided in the form of electronic literature (e.g. comics, art catalogs, language courses, etc.), and a flexible way to manipulate them will be needed.

There are no solutions up to now which try to recreate intuitive actions for previewing "paper" content in a digital e-book. For example, it is not possible to "leaf" through the pages of an electronic document.

Therefore, one embodiment of the present invention particularly refers to a previewing system for hand-held computer devices (e.g. e-book devices) which can be used for displaying electronic documents. The invention further pertains to input add-ons to an e-book device, which can be used for recreating the experience of leafing through the pages of a book. Said e-book device comprises a touch-sensitive surface which can be used for virtually navigating through the digital pages (see FIGS. 14*a-c*), e.g. by touching various elements of an integrated linear-scaled touch-sensitive stripe 1404*a* (see diagram 1400*a*), shifting and/or turning a cylindrical control device 1404*b* (see diagram 1400*b*) or moving a finger over a nonlinear-scaled touch-sensitive stripe 1404*c*, wherein the finger position on said stripe corresponds to a selected speed of browsing and/or the displayed detail level of presentation (see diagram 1400*c*). What is offered by this preview system is a dynamic layout of an original electronic content (e.g. pages from an electronic magazine or from a requested Web site) that is automatically adapted to a user's navigation actions.

A three-dimensional schematic view of an electronic book device 1600 having a touch-sensitive display 1502 for inputting control information needed to increase or decrease the speed of browsing and/or the detail level of presentation to be displayed through the pages of the electronic book is shown in FIG. 16.

One embodiment of the invention pertains to the use of specific interaction patterns in the scope of the proposed leafing model. Thereby, input devices as described above are able to detect different kinds of user interactions, e.g. user commands trying to change the speed and/or direction of browsing ("speed-dependent scrolling"), to change the abstraction level of presentation (which means to modify the spatial, temporal and/or semantic layout) or to randomly access pages of an electronic document (non-linear long displacements, see description below).

Figure 15:
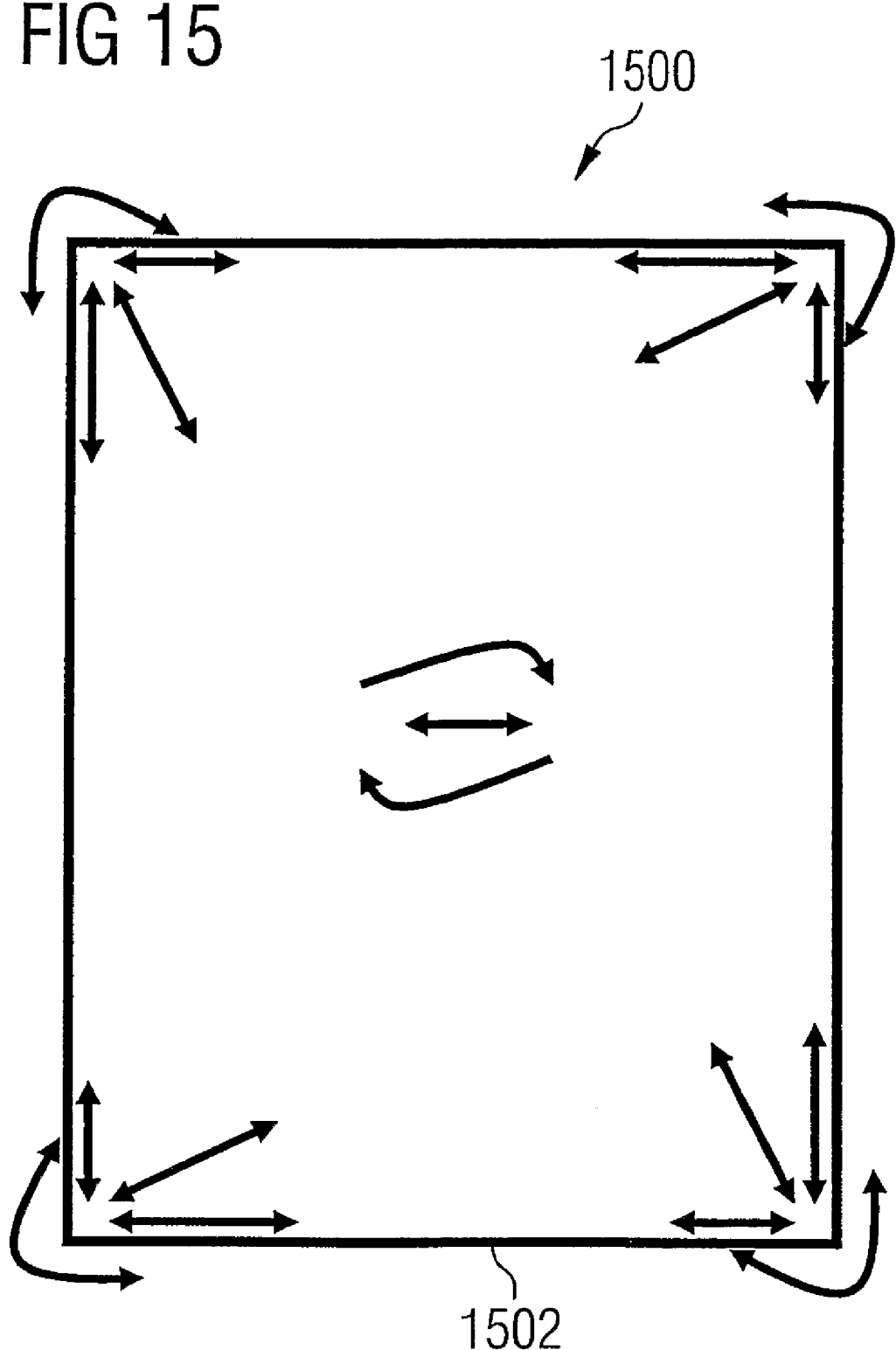
FIG. 15 is a schematic diagram showing examples of a user's input actions for navigating through the pages of an electronic book.

FIG. 15 shows different examples of a user's input actions for navigating through the pages of an electronic book by moving a finger across a touch-sensitive display 1502 of an electronic book device 1600 to control the speed of browsing and/or the detail level of presentation to be displayed. Besides so-called "displacement events" (rotational or translational movements of a user's finger in any direction across the touch-sensitive display 1502 for navigating through the pages of the electronic book 1600, the length of the movement path being directly proportional to the speed of browsing and/or the detail level of presentation to be displayed) so-called "stroke events" (forces or the duration of forces exerted by a user's finger to the surface of the touch-sensitive display 1502 to navigate through the pages of the electronic book 1600, said force being directly proportional to the speed of browsing and/or the detail level of presentation to be displayed)

addressed by the present invention can be used as input actions to change the detail level and/or speed of browsing. The user should be able to leaf through the pages of the e-book as through the pages of a traditional book; in this case the book can be browsed in a pseudo-random way, and the fingers of the user can give the pace of browsing. Speed-dependent, fuzzier, more intuitive interaction patterns are also conceivable.

The e-book system reacts to these actions by simulating the human process of "leafing" through the pages of a book, magazine or newspaper, and displaying the content by using different semantic degrees. These semantic degrees are generated by decomposing the original digital content into multiple information modes or channels (text, pictures, etc.). Additionally, any mode can be displayed on a different abstraction level of presentation or with a different spatial focus (e.g. key words for textual information, coarse-grained pictures, etc.).

Three different possibilities of implementing the proposed video leafing model are shown in FIGS. 18*a+b*.

The diagrams depicted in FIG. 18*a* illustrate how the detail level of presentation V for the spatial and temporal layout of a displayed video sequence can be modified dependent on user commands demanding a change in the speed of browsing. As can be seen, V depends on the resolution and size of displayed keyframe images 306*a-e* showing shots from a skimmed video sequence and with the duration D of display, respectively.

A diagram 1800*b* showing a non-linear 'long' displacement action with a dynamic spatial-temporal-semantic information layout is shown in FIG. 18*b*. Thereby, the detail level of presentation V is a function of time t; it increases or decreases with the resolution and size of displayed keyframe images 306*a-e*.

The main limitations of the proposed multimedia leafing approach are to find the right spatial-temporal layout of the multimedia information to be displayed and the semantic decomposition of complex multimedia content.

In FIGS. 11*a-c*, 12*a-c* and 13*a-g* some possible examples for a semantic reconfiguration of the layout of textual or pictorial information during a "leafing" navigation are shown.

Figure 11C:
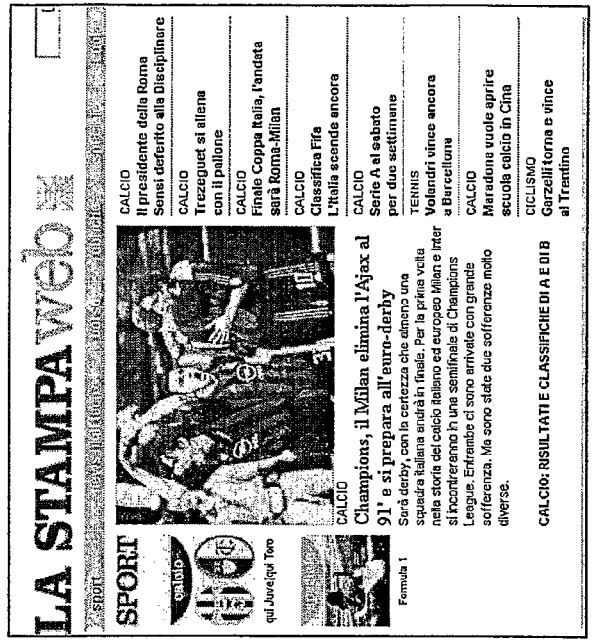
FIGS. 11a-c are different layouts of the same electronic paper (e.g. a Web page)
Figure 11B:
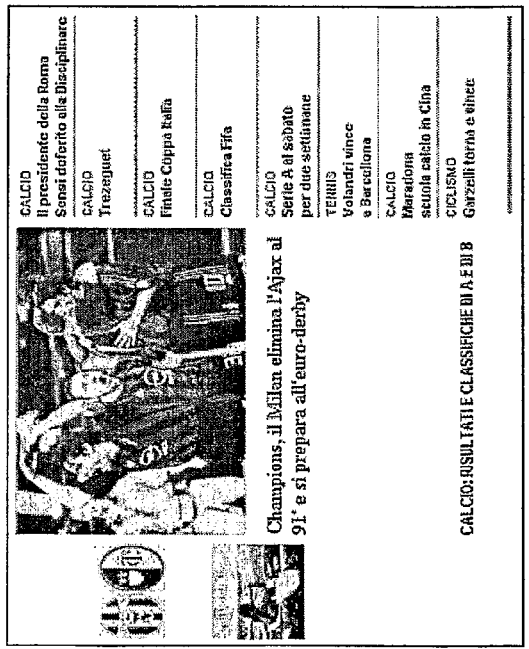
Figure 11A:
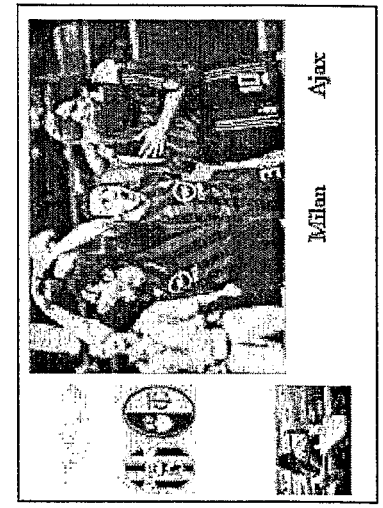

An electronic paper page can be displayed with different layouts depending on the speed of browsing. FIGS. 11*a-c* show three different layouts of the same electronic paper (e.g. a Web page), wherein the semantic focus is set proportional to the navigation speed of a user skimming the content of said document while surfing through the Internet. Thereby, each element on a displayed Web page is weighted for its semantic value, which can be calculated with empirical association to the different typographic parts of the page or can explicitly be added during the editing phase by the authors. Increasing browsing speed reduces the number of elements and filters them proportionally to their semantic weight. Ideally, each displayed element is able to change its physical appearance (e.g. dimensions, colors) and its abstraction level of presentation.

As shown in FIGS. 12*a-c*, the same concept can be generalized by using different layouts: In this case, we have a page that contains three different elements (pictures, title, and body text).

Figure 13:
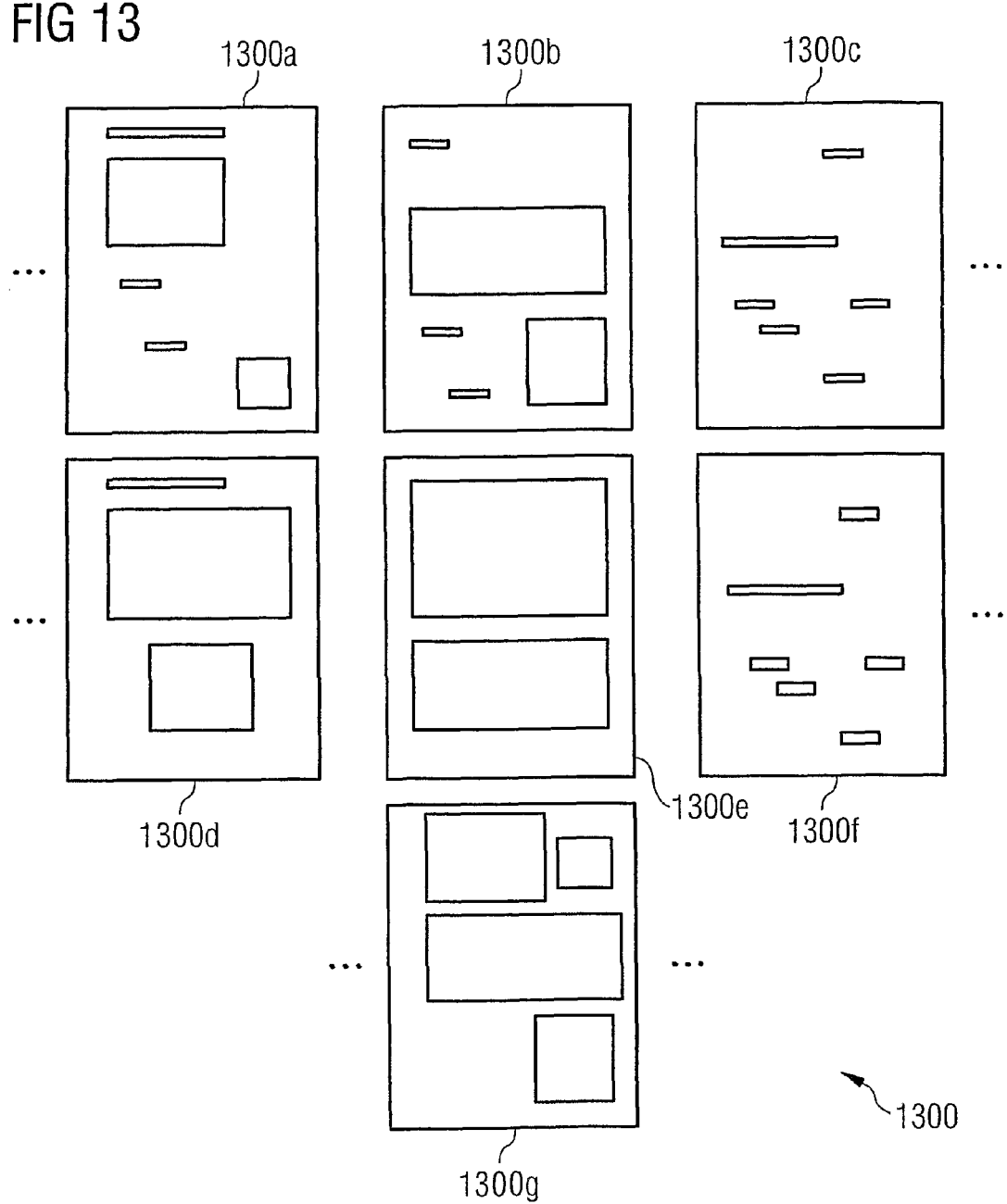
FIG. 13 shows seven schematic layouts of a page from an electronic paper during a fast browsing.
Figure 14:
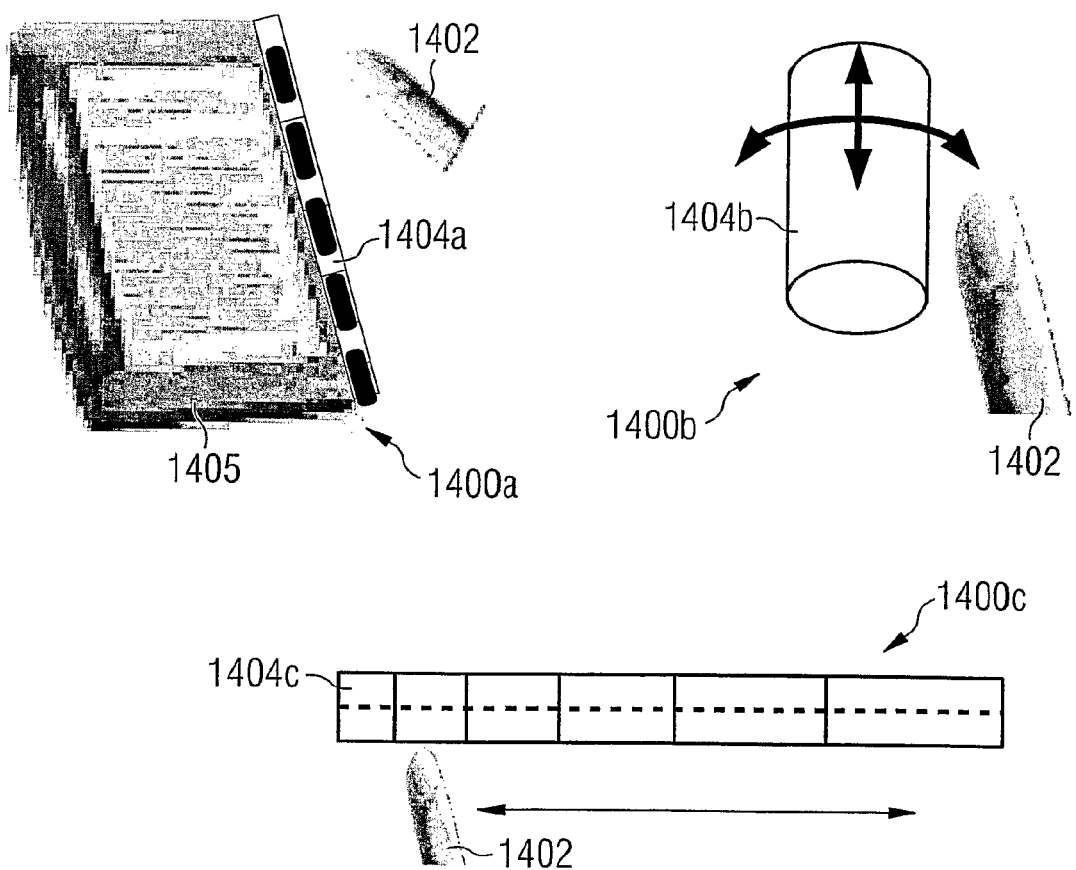
FIG. 14 shows different examples of input and control devices which can be used for creating "leafing events" needed for browsing the content of an electronic paper.

FIG. 13 shows seven schematic layouts of a page from an electronic paper during a fast browsing, wherein the semantic focus is set proportional to the navigation speed of a user leafing the electronic paper. In the first three pages (1300*a-c*) the main layout is maintained; only very important semantic objects are left (pictures, key words, etc.). In the second three pages (1300*d-f*) the objects itself are spatially emphasized. The seventh page (1300*g*) shows a completely new layout which is formed by composing N pages containing semantically important objects.

For implementing the above system any kind of electronic paper format can be used. Information decomposition can be done automatically following some general heuristic rules or predefined formatting tags (e.g. in HTML <h1></h1>, <h2></h2>). Therefore, special tags in the electronic format are introduced for including explicitly different semantic degrees. This additional information, which is transparently disabled during the normal reading speed, can be used to properly change the layout of displayed documents during fast navigation.

According to a further embodiment of the present invention, digital audio content can be "pre-heard" by using the same navigation patterns described in the above sections. Nowadays, audio "preview" is not done because the nature of audio data does not allow doing fast navigation. Some techniques have been introduced to fast browsing audio by reducing silent intervals. However, techniques that apply only pure audio fast forwarding have only very limited fields of application.

In the case of digital audio data containing multiple types of audio information (e.g. music with speech, pure speech, rhythm, musical instruments, etc.), the same browsing techniques used for video and text data can be applied. According to the invention, a user can move the content on different modes (text, visual objects, etc.), speed up the browsing of these content and come back to the normal audio mode.

Furthermore, a semantic zoom function for pre-hearing audio data by fast navigating through digital audio content is proposed. For this purpose, some supporting metadata are associated to a pure audio stream, e.g. text for the speech parts, colors for different characteristics of the music parts (e.g. different parts of a musical piece, melody, rhythm and instrumentation of particular motifs, leitmotifs or themes, etc.). All this information must contain synchronized data with the original audio content. This metadata, embedded in the audio stream (e.g. in the MPEG-7 format) or in a separate data block (e.g. in the XML format), can be used for navigating, pre-hearing, and making a digest of the audio content.

FIG. 17 shows a graphical user interface of a client terminal 1006 running an application program for controlling an audio player 1706 downloaded from an application server in a client/server-based network environment, said audio player 1706 being capable of executing an audio leafing procedure according to one embodiment of the present invention. The user, while listening to the melody of a requested song, can e.g. press a fast-forward button, and then e.g. the song's lyrics are displayed and scrolled at a fast speed such that the user can easily follow the fast text scrolling and search for key words in order to re-start the listening from another point of the audio track.

In case of pure audio content (such as e.g. a classical symphony), this process can be done by using different colors for indicating the different movements of a symphony or parts of a movement (e.g. exposition, development, recapitulation, and coda). In this case, a taskbar appears on a user's desk-top which indicates different movements or movement parts of said symphony with the aid of different colors. Textual information (e.g. a song's lyrics) can easily and quickly be scrolled forward and backward.

| Depicted Features and their Corresponding Reference Signs | |
|---|---|
| No. | Technical Feature (System Component, Procedure Step) |
| 100a-c | three diagrams showing different types and speeds of leafing through an illustrated magazine, thereby enabling a reader to focus on specific parts of a page and, depending on his/her specific interests, browse respectively quicker or slower through the content of said magazine |
| 100d | flow chart illustrating an algorithm which approximates the mental process of a person while leafing through an illustrated magazine |
| 200 | diagram illustrating the multimedia decomposition process applied to the content of a video sequence presented by a multimedia preview system, |
| 202a-c | spatial layouts showing different detail levels of presentation for the content of a video sequence to be previewed in text and/or image |
| 300 | diagram showing a schematic example of a spatial layout showing different detail levels of presentation for the content of a video sequence to be previewed in text and/or image |
| 302 | progress bar showing the playing time of a video sequence displayed on the screen or display of said user's client terminal as a percentage of the total playing time |
| 304, 304a-d | virtual keys for indicating direction and speed for playing, forwarding or rewinding said video sequence |
| 306a-e | high-resolution large-sized keyframe images showing shots from said video sequence |
| 308a-h | low-resolution small-sized keyframe images (so-called „thumb nails") showing particular shots from said video sequence |
| 310 | frame for displaying dynamically changing text containing dialogs from a video sequence displayed on said client terminal |
| 312 | frame for displaying dynamically changing text containing a summary of the underlying story for the video sequence displayed on said client terminal |
| 314 | video data encompassing video frames from said video sequence |
| 316 | audio data encompassing audio frames (music, sound and/or speech) added to said video sequence |
| 400 | program sequence showing an XML-based representation of metadata which is used for browsing the content of multimedia data to be previewed |
| 500 | timing diagram of a virtually structured movie |
| 502a | keyframe track showing the display times of the large- and small-sized images 306a-e and 308a-h, respectively |
| 502b | video track showing the playing times of said video data 314 |
| 502c | text track showing the display times of said dialog text 310 |
| 502d | text track showing the display times for the summary text 312 of the underlying story |
| 502e | audio track showing the playing times of said audio data 316 |
| 600a | diagram showing different input and navigation control devices which can be used as human-machine interfaces for previewing a video sequence |
| 600b | diagram showing an example of browsing through a video sequence by using the „semantic zoom" function offered by the video preview system according to one embodiment of the present invention |
| 602a | three-key touch pad display serving as a human-machine interface for navigating through a list of symbols for playing, slow/fast scrolling or skimming a video sequence |
| 602b | rolling mouse serving as a human-machine interface for performing the aforementioned navigating actions |
| 602c | remote control device having control keys for executing functions of a video cassette recorder (VCR) |
| 700a-d | four diagrams illustrating the dynamic presentation layout during a browsing process |
| 800a | bendable PDA, |
| 800b | credit-card sized display device („tourist browser") with an integrated navigation system, |
| 800c-e | different detail levels of a virtual map displayed on an integrated display 802a (802b) of the bendable PDA 800a or credit-card sized display device 800b, respectively |
| 800f | rear side of the credit-card sized display device 800b, which comprises an integrated touch pad 804a |
| 802a | rigid display of the bendable PDA 800a |
| 802b | flexible OLED display of the credit-card sized display device 800c, based on organic polymer electronics |

Depicted Features and their Corresponding Reference Signs

| No. | Technical Feature (System Component, Procedure Step) |
|---|---|
| 804a | touch pad of the bendable PDA 800a, which is used for steering a cursor displayed on the PDA's display 802a |
| 804b | touch pad on the rear side 800f of the credit-card sized display device 800b, which is used for steering a cursor displayed on the display 802b of the credit-card sized display device 800b |
| 900 | diagram showing a DVD cover with integrated display capabilities which can be used as a human-machine interface for remotely controlling a video preview system according to the present invention |
| 902 | integrated display of said DVD cover 900, used for browsing the content of a video sequence to be previewed in text and/or image |
| 904 | leafing output data displayed on the integrated display 902 of said DVD cover 900 |
| 906a + b | navigation-sensitive areas of said DVD cover 900 |
| 1000 | multimedia preview system in a client/server-based network environment for browsing the content of requested multimedia data to be previewed, |
| 1002 | multimedia server in said video-on-demand system 1000 for browsing the content of requested multimedia data to be previewed |
| 1004a | any data carrier of a file-serving system connected to said multimedia server 1002, said file-serving system storing the multimedia data to be previewed |
| 1004b | XML-based representation of metadata associated to the content of said multimedia data, used for browsing said multimedia data |
| 1006 | client terminal having a display for previewing said multimedia data |
| 1100a-c | three different layouts of the same electronic paper (e.g. a Web page), |
| 1200a-c | three schematic layouts of an electronic paper consisting of different frames for displaying pictures, titles and body text, |
| 1202 | frame for displaying pictures referring to text passages contained in said Web document |
| 1204 | frame for displaying titles of text passages contained in said of said Web document |
| 1206 | frame for displaying body text of said Web document |
| 1300 | seven schematic layouts of a page from an electronic paper during a fast browsing, |
| 1300a-c | three layouts of said page, wherein the main layout is maintained irrespective of a user's speed of browsing but during a fast browsing only very important semantic objects (pictures, key words, etc.) are left |
| 1300d-f | three further layouts of said page, wherein displayed objects (pictures and/or text passages) are spatially emphasized during a fast browsing |
| 1300g | a still further layout of said page, obtained after having composed the content of N pages for displaying semantically important objects only |
| 1400 | three examples of input and control devices which can be used for creating „leafing events" needed for browsing the content of an electronic paper according to the present invention |
| 1400a | diagram showing a user's forefinger 1402 navigating through electronic documents stored in an electronic book device 1405 by touching various elements of an integrated linear-scaled touch-sensitive stripe 1404a |
| 1400b | diagram showing a user's forefinger 1402 navigating through electronic documents stored in an electronic book device 1405 by shifting and/or turning a cylindrical control device 1404b |
| 1400c | diagram showing a user's forefinger 1402 navigating through electronic documents stored in an electronic book device 1405 by moving over a nonlinear-scaled touch-sensitive stripe 1404c, |
| 1402 | a user's forefinger leafing through the pages of e.g. an electronic paper |
| 1404a | linear-scaled touch-sensitive stripe for navigating through the pages of the electronic book device 1405 |
| 1404b | cylindrical control device for navigating through the pages of the electronic book device 1405 |
| 1404c | nonlinear-scaled touch-sensitive stripe for navigating through the pages of the electronic book device 1405 |
| 1405 | electronic book device |
| 1500 | schematic diagram showing examples of a user's input actions for navigating through the pages of an electronic book 1600 by moving a finger across a touch-sensitive display 1502 to control the speed of browsing and/or the detail level of presentation to be displayed |
| 1502 | touch-sensitive display or any other touch-sensitive surface of the electronic book device 1600 |
| 1600 | three-dimensional schematic view of an electronic book device having a touch-sensitive display 1502 for inputting control information needed to increase or decrease the speed of browsing and/or the detail level of presentation to be displayed through the pages of the electronic book |
| 1700 | graphical user interface of a client terminal 1006 running an application program for controlling an audio player 1706 downloaded from an application server in a client/server-based network environment, |
| 1702 | virtual fast-forward keys, displayed on the screen of the client terminal 1006 controlling said audio player |
| 1704 | display of said client terminal 1006 for displaying browsed text passages of a requested song's lyrics |
| 1706 | audio player, downloaded from an application server |
| 1800a | diagram illustrating a speed-dependent spatial-temporal-semantic information layout |
| 1800b | diagram showing a non-linear 'long' displacement action with a dynamic spatial-temporal-semantic information layout |
| S0 | step #0: downloading multimedia data from the multimedia server 1002 to said client terminal 1006 via a network link |
| S1a | step #1a: said multimedia server 1002 receiving user commands demanding a change in the speed of browsing and/or in the abstraction level of presentation, in the following referred to as „representation parameters" |
| S1b | step #1b: said multimedia server 1002 processing said user commands |
| S2 | step #2: decomposing said multimedia data into non-redundant and redundant, less relevant parts according to an offline image and/or text segmentation algorithm |
| S3 | step #3: adapting said representation parameters by online filtering out (S3') a certain amount of said redundant, less relevant parts depending on type and/or frequency of said user commands such that the degree of presented details is the higher the lower the speed of presentation and vice versa |
| S4 | step #4: displaying an adapted version of said multimedia data on said client terminal 1006 |
| S5a | step #5a: associating metadata of any kind allowing users to identify segmented parts of multimedia data to be previewed to said multimedia data |
| S5b | step #5b: synchronizing said metadata with said multimedia data |
| S100a | step #100a: query whether a reader knows enough about a specific topic |
| S100b | step #100b: coarse-grained leafing, which means leafing a document from a Web page, an electronic book or an electronic magazine at fast speed and extracting only coarse content (e.g. pictures and titles) |
| S100c | step #100c: query whether a specific page of said document is selected |
| S100d | step #100d: finer-grained scanning, which means scanning the content around said pictures or titles for getting more details |
| S100e | step #100e: query whether said reader is further interested |
| S100f | step #100f: fine-grained reading, which means reading the content of said document in detail |

The invention claimed is:
1. A multimedia preview system in a client/server-based network environment for browsing content of requested mul- timedia data to be previewed, the content to be displayed on a client terminal for accessing a multimedia server configured to hold the requested multimedia data, the multimedia preview system comprising:

an interface configured to receive commands indicating a speed at which the multimedia preview system is to browse through at least one of text and an image associated with the requested multimedia data; and controlling means for controlling visual information for different abstraction levels based on a weighted semantic value of the requested multimedia data and for adapting an abstraction level of a presentation of the at least one of the text and the image, depending on at least markup tags descriptive for and associated with the requested multimedia data and a frequency of the commands and depending upon a combination of the spatial, temporal and semantic layout of said data, such that the abstraction level of the presentation of the at least one of the text and the image is lower when the speed is lower and vice versa, and for changing a layout of the at least one of the text and the image, depending on the speed, the controlling means including a touch-sensitive display configured to navigate through the requested multimedia data to be previewed.

2. The system according to claim 1, further comprising:
means for displaying the requested multimedia data with different layouts depending on the speed.

3. The system according to claim 1, further comprising:
means for setting a semantic focus, proportional to the speed, of the requested multimedia data.

4. The system according to claim 1, further comprising:
means for introducing the markup tags in the requested multimedia data for changing the layout of the at least one of the text and the image.

5. The multimedia preview system according to claim 1, wherein the multimedia preview system is a video-on-demand system with video browsing means for varying the speed and the abstraction level of the presentation of the at least one of the text and the image, depending on at least the frequency of the commands instructing the multimedia preview system to change the speed such that the abstraction level is lower when the speed is lower and vice versa.

6. A method for browsing content of multimedia data to be previewed, the content being displayed on a client terminal for accessing a multimedia server which holds the multimedia data, comprising:

downloading the multimedia data from the multimedia server to the client terminal via a network link;

receiving and processing, at the multimedia server, commands of representation parameters demanding a change in at least one of a speed of browsing and in an abstraction level of a presentation of at least one of text and an image associated with the multimedia data;

decomposing the multimedia data into non-redundant and redundant, less relevant parts for obtaining visual information for different abstraction levels based on a weighted semantic value of the requested multimedia data;

adapting the representation parameters by online filtering out a certain amount of the redundant, less relevant parts depending on at least markup tags descriptive for and associated with the multimedia data and a frequency of the commands and depending upon a combination of the spatial, temporal and semantic layout of said data, such that the abstraction level of the presentation of the at least one of the text and the image is lower when the speed of browsing is lower and vice versa; and displaying an adapted version of the multimedia data on the client terminal, wherein a layout of the at least one of the text and the image is changed depending on the speed of browsing, and the commands are based on movements of a pressure across a touch-sensitive display.

7. The method according to claim 6, wherein the at least one of the text and the image is displayed with different layouts depending on the speed of browsing.

8. The method according to claim 6, wherein a semantic focus of the multimedia data is set proportional to the speed of browsing.

9. The method according to claim 6, wherein the markup tags are introduced in the multimedia data for changing the layout of the at least one of the text and the image.

10. The method according to claim 6, further comprising:
associating the markup tags, allowing identification of segmented parts of the multimedia data to be previewed, to the multimedia data; and
synchronizing the markup tags with the multimedia data.

11. The method according to claim 6, wherein a length of a movement path of one of the movements is directly proportional to at least one of the speed of browsing and the abstraction level of the presentation of the at least one of the text and the image, during the displaying the multimedia data.

12. The method according to claim 6, wherein the commands are based on forces exerted to a surface of the touch-sensitive display, one of the forces being directly proportional to at least one of the speed of browsing and the abstraction level of the presentation of the at least one of the text and the image, during the displaying the multimedia data.

13. The method according to claim 6, wherein the commands are based on a duration of forces exerted to a surface of the touch-sensitive display, the duration being directly proportional to at least one of the speed of browsing and the abstraction level of the presentation of the at least one of the text and the image, during the displaying the multimedia data.

14. A multimedia preview system in a client/server-based network environment for browsing content of requested multimedia data to be previewed, the content to be displayed on a client terminal for accessing a multimedia server configured to hold the requested multimedia data, the multimedia preview system comprising:

a processor configured to control visual information for different abstraction levels based on a weighted semantic value of the requested multimedia data and to adapt an abstraction level of a presentation of at least one of text and an image associated with the requested multimedia data, depending on markup tags descriptive for and associated with the requested multimedia data and a frequency of commands and depending upon a combination of the spatial, temporal and semantic layout of said data indicating a speed at which the multimedia preview system is to browse through the at least one of the text and the image, such that the abstraction level of the presentation of the at least one of the text and the image is lower when the speed is lower and vice versa, and to change a layout of the at least one of the text and the image depending on the speed; and a touch-sensitive display configured to navigate through the requested multimedia data to be previewed.

15. The system according to claim 14, further comprising:
a display unit configured to display the requested multimedia data with different layouts depending on the speed.

16. The system according to claim 14, further comprising:
a setting unit configured to set a semantic focus, proportional to the speed, of the requested multimedia data.

17. The system according to claim 14, further comprising:
an editing unit configured to introduce the markup tags in the requested multimedia data for changing the layout of the at least one of the text and the image.

18. The multimedia preview system according to claim 14, wherein the multimedia preview system is a video-on-demand system configured to vary the speed and the abstraction level of the presentation of the at least one of the text and the image, depending on at least the frequency of the commands instructing the multimedia preview system to change the speed such that the abstraction level is lower when the speed is lower and vice versa.

* * * * *